United States Patent [19]
Yoda et al.

[11] Patent Number: 5,872,693
[45] Date of Patent: Feb. 16, 1999

[54] THIN-FILM MAGNETIC HEAD HAVING A PORTION OF THE UPPER MAGNETIC CORE COPLANAR WITH A PORTION OF THE LOWER MAGNETIC CORE

[75] Inventors: Hiroaki Yoda; Atsuhito Sawabe; Naoyuki Inoue; Akio Hori, all of Kanagawa-ken, Japan

[73] Assignee: Kabushiki Kaisha Toshiba, Kawasaki, Japan

[21] Appl. No.: 826,749

[22] Filed: Mar. 24, 1997

Related U.S. Application Data

[63] Continuation of Ser. No. 288,246, Aug. 9, 1994, abandoned.

[30] Foreign Application Priority Data

Aug. 10, 1993 [JP] Japan .................................... 5-198350
Sep. 21, 1993 [JP] Japan .................................... 5-235042

[51] Int. Cl.⁶ ....................................................... G11B 5/31
[52] U.S. Cl. ............................................................ 360/126
[58] Field of Search ................................... 360/119, 122, 360/125, 126, 127; 29/603

[56] References Cited

U.S. PATENT DOCUMENTS

| | | |
|---|---|---|
| 4,589,042 | 5/1986 | Anderson et al. . |
| 4,839,197 | 6/1989 | Henderson . |
| 5,245,493 | 9/1993 | Kawabe et al. ........................ 360/126 |
| 5,285,340 | 2/1994 | Ju et al. .................................. 360/119 |
| 5,325,254 | 6/1994 | Cooperrider ........................... 360/126 |
| 5,349,745 | 9/1994 | Kawabe et al. ........................... 29/603 |
| 5,379,172 | 1/1995 | Liao ....................................... 360/126 |
| 5,652,687 | 7/1997 | Chen et al. ............................. 360/126 |

FOREIGN PATENT DOCUMENTS

| | | |
|---|---|---|
| 2-54412 | 2/1990 | Japan . |
| 2-208812 | 8/1990 | Japan . |
| 3-91108 | 4/1991 | Japan . |
| 3-296907 | 12/1991 | Japan . |
| 5-81613 | 4/1993 | Japan . |

OTHER PUBLICATIONS

"Three–Dimenional Pole Edge Effect On Narrow Track Film Heads", Kishigami et. al., IEEE Transactions On Magnetics, 24(6):2841–2843 (1988).

"Fabrication Of Thin Film Inductive Heads With Top Core Separated Structure", T. Tawabe et. al., IEEE Transactions On Magnetics, 27(6):4936–4938 (1991).

*Primary Examiner*—Brian E. Miller
*Attorney, Agent, or Firm*—Finnegan, Henderson, Farabow, Garrett & Dunner, L.L.P.

[57] ABSTRACT

A thin-film magnetic head comprising a lower magnetic core formed on a substrate, an upper magnetic core formed on the lower magnetic core with a magnetic gap therebetween, and a coil interposed between the lower magnetic core and the upper magnetic core as insulated from the lower magnetic core and the upper magnetic core, characterized in that at least either of the lower magnetic core and the upper magnetic core comprises a front body of a magnetic pole facing a magnetic recording medium and a rear body of a magnetic pole having part thereof superposed on the front body of the magnetic pole, the rear body of the magnetic pole is disposed as recessed from the head surface facing the medium and held in contact with the front body of the magnetic pole in a plane, the plane is terminated at a rear of the end of the front body of the magnetic pole, and the rear body of the magnetic pole has a shape curved or bent in the direction opposite to the magnetic gap, and further the front body of the magnetic pole is composed of a magnetic member embedded in a trench formed in advance in an insulating layer.

38 Claims, 24 Drawing Sheets

5,872,693

THIN-FILM MAGNETIC HEAD HAVING A PORTION OF THE UPPER MAGNETIC CORE COPLANAR WITH A PORTION OF THE LOWER MAGNETIC CORE

This application is a continuation of application Ser. No. 08/288,246 filed Aug. 9, 1994, now abandoned.

BACKGROUND OF THE INVENTION

1. Field of the Invention

This invention relates to a thin-film magnetic head.

2. Description of the Related Art

In recent years, the densification of magnetic recording has advanced to a point where systems of such high recording density as 500 Mb/inch$^2$ in VTR and 200 Mb/inch$^2$ in HDD have already found acceptance for practical use. Demands for further densification of magnetic recording know no bound. In consequence of the advancing densification of recording, the decrease of track width has become an essential task. The HDD of a recording density of 200 Mb/inch$^2$, for example, has sufficiently fulfilled its purpose when the width of a track is 7 µm the interval between tracks is about 2 µm, and the tolerance of track width is roughly equal to the interval between tracks (2 µm). In order that the HDD may allow further densification of recording, it becomes necessary to decrease the track width to below 5 or 6 µm and the tolerance to below 0.5 µm. Further, it is suspected that the densification of recording to the order of 10 Gb/inch$^2$ will require the track width to be not more than 1 µm and the tolerance to be in the neighborhood of 0.1 µm. To satisfy these requirements, the magnetic head calls for a distinct improvement.

FIG. 11 and FIG. 12 illustrate the construction of a conventional thin-film magnetic head. In these diagrams, 1 denotes a substrate which is formed of such as Al$_2$O$_3$.TiC. On this substrate 1, a first magnetic layer which is made as of Permalloy and destined to serve as a lower magnetic core 3 is superposed through the medium of an insulating layer 2 made as of Al$_2$O$_3$. On the lower magnetic core 3 are superposed a magnetic gap 4 made as of SiO$_2$ and an insulating layer 6 made as of polyimide and having embedded therein a coil 5 made as of Cu. On the insulating layer 6, a second magnetic layer destined to serve as an upper magnetic core 7 is formed. A protective layer 8 made as of Al$_2$O$_3$ is formed on the substrate 1 including the upper side of the upper magnetic core 7.

With respect to the conventional thin-film magnetic head which is provided with such lower magnetic core 3 and such upper magnetic core 7 as are shaped as described above, it has been pointed out that if the width of a track thereof is decreased to the neighborhood of 4 µm, for example, the magnetic head will be at a disadvantage in tending to orient the axis of easy magnetization thereof in the direction perpendicular to the direction of track width, entailing a decline in the permeability thereof, and inducing degradation of the head characteristics, particularly high-frequency response characteristics ["Magnetic Properties of a Narrow-Stripe C—Ta—Zr Amorphous Film," written by Hiroshi Mitsuya et al. and published in the Journal of Japan Applied Magnetics Society, 12, 255–258 (1988)].

The impartation of a track width to the conventional thin-film magnetic head which is constructed as illustrated in FIG. 11 and FIG. 12 is accomplished by selective plating as with Permalloy. In this case, it is the accuracy with which a resist is patterned in the PEP process (photoengravement process) prior to the selective plating that determines the accuracy of the track width. In the case of the thin-film magnetic head, the difference of level h embracing the underlying layers prior to the formation thereon of the upper magnetic core 7 is about 10 µm. In order for this difference of level to be thoroughly covered, the resist requires a thickness equalling this difference of level. For all the possible devices available for coating, the resist requires a thickness of at least about 5 µm.

When the exposure is carried out by the contact method, the distance between the surface of a photomask and the bottom surface of the resist is about 15 µm (10 µm difference of level +5 µm thickness of resist) at least. The size of an unfocussed spot (the range in which the intensity of light changes from 100% to 50%) due to the Fresnel diffraction which is attendant on the contact exposure of this nature is found by calculation to be 3.5 µm, an unfitting magnitude even for the density of 200 Mb/inch$^2$ [interval between tracks (guard band) about 2 µm], let alone the accuracy of track width to be achieved in the distant future.

As a solution to this problem, the method of effecting the impartation of a track from the side (ABS layer side) facing the medium has been proposed (IEEE Transaction on Magnetics, Vol. 24, No. 6, November 1988, pp. 2841–2843). Similarly, the method of effecting the impartation of a track from the surface facing the medium by the FIB (focussed ion beam) etching technique has been proposed (refer to JP-A-03-296,907). Though these methods are capable of securing the accuracy of track width as aimed at, they entail a serious problem in terms of the adaptability for mass production because the individual heads on a production line must be processed one by one and because the throughput of FIB's themselves is unusually poor.

Further, the method which aims to narrow the tolerance of processing by forming the upper magnetic core 7 in the form of the combination of a front body 7a vested with the general appearance of a fan with a rear body 7b extended as far as the rear gap part and shaping the leading half part by the ion beam milling technique in the early stage of manufacture in which the difference of level across the underlying layers is relatively small has been proposed (IEEE Transaction on Magnetics, Vol. 27, No. 6, November 1991, pp. 4936–4938). So long as the front body 7a of the upper magnetic core 7 is fabricated by the ion beam milling technique, however, the difference between the size of the resist mask and that of the finished magnetic core is inevitably large and is hardly fit for the density of 10 Gb/inch$^2$. So long as this method relies for the shaping in question on the ion beam milling technique, it cannot contribute to enhance the productivity because the rate of the milling work is as low as some tens of nm/min. Further, when the ion beam milling technique involves the introduction of a fluorine type gas, the method suffers from a marked decline of productivity because various deposits occur inside the ion beam gun and prevent the gun from being stably used for a long time.

The method which resides in utilizing a selective plating technique for the formation of the front body 7a in the general shape of a fan has been also known. So long as the selective plating technique is used, however, the thickness of the resist mask and the difference of level h' do not deserve to be disregarded. Since the resist must be patterned at least in a depth closely approximating the total thickness (about 6 µm) of the lower and the upper magnetic core, the tolerance of the accuracy of patterning of the resist itself is inevitably enlarged. Besides, very minute portions of the front body 7a are given the desired selective plating only with difficulty.

In any of the methods described above, the width of the upper and the lower magnetic core opposed to each other across the gap (the upper and lower pole width) cannot be completely equalized because the alignment error occurring between the upper and the lower magnetic core demands due respect and, therefore, the upper magnetic core must be decreased from the lower magnetic core by a margin roughly twice as large as the alignment error. Even in the absence of misalignment, the problem of possibly aggravating the burden of side righting will ensue.

As described above, the construction of the thin-film magnetic head and the technique for the impartation of a track to the magnetic head which have been known to the art to date are hardly fit for such accuracy of track width as 10 Gb/inch$^2$ because they have limits of their own in narrowing the interval between tracks. Thus, the art has not yet realized a thin-film magnetic head of a narrow track interval which satisfies both the requirements regarding dimensional tolerance and adaptability for mass production. The desirability of improving the existing thin-film magnetic head, therefore, has been finding enthusiastic recognition.

SUMMARY OF THE INVENTION

This invention has been produced for the purpose of solving the problems mentioned above. An object of this invention is to provide a thin-film magnetic head which permits a narrow track fit for the accuracy of up to 10 Gb/inch$^2$ to be formed thereon while satisfying both dimensional tolerance and adaptability for mass production.

The first thin-film magnetic head of the present invention comprises a lower magnetic core formed on a substrate, an upper magnetic core formed on the lower magnetic core with the medium of magnetic gap therebetween, and a coil interposed between the lower magnetic core and the upper magnetic core as insulated from the lower magnetic core and the upper magnetic core, and is characterized in that at least either of the lower magnetic core and the upper magnetic core comprises a front body of a magnetic pole facing a magnetic recording medium and a rear body of the magnetic pole having part thereof superposed on the front body of the magnetic pole, the rear body of the magnetic pole is disposed as recessed from the head surface facing the magnetic recording medium and held in contact with the front body of the magnetic pole in a plane, and the plane is terminated at a rear of the end of the front body of the magnetic pole, and the rear body of the magnetic pole having a shape curved or bent in the direction opposite to the magnetic gap.

The second thin-film magnetic head of the present invention comprises a lower magnetic core formed on a substrate, an upper magnetic core formed on the lower magnetic core with the medium of magnetic gap therebetween, and a coil interposed between the lower magnetic core and the upper magnetic core as insulated from the lower magnetic core and the upper magnetic core, and is characterized in that at least either of the lower magnetic core and the upper magnetic core comprises a front body of a magnetic pole facing a magnetic recording medium and a rear body of the magnetic pole having part thereof superposed on the front body of a magnetic pole, and the front body of the magnetic pole is disposed on the same plane as at least part of the remainder of the choice between the lower magnetic core and the upper magnetic core.

In the first and the second thin-film magnetic head of the present invention mentioned above, the front body of the magnetic pole may be made of a magnetic material different from that of the rear body of the magnetic pole. For example, the front body of the magnetic pole may be made of a magnetic material having a small anisotropic magnetic field and the rear body of the magnetic pole may be made of a magnetic material having a large anisotropic magnetic field, thereby magnetic properties thereof being improved.

Further, in the first and second thin-film magnetic head of the present invention, the front body of the magnetic pole has a laminated construction having a nonmagnetic layer interposed between a plurality of magnetic layers.

Further in the first and the second thin-film magnetic head of the present invention mentioned above, the front body of the magnetic pole is formed of a magnetic material embedded by collimation sputter in a trench formed in advance in part of an insulation layer.

The outer edges of the bottom surface of the magnetic member embedded in the trench or the upper outer edges of the lateral walls of the trench are chamfered.

Still further, in the first and second thin-film magnetic heads of the present invention, the front body of the magnetic pole has the shape of a substantially rectangular solid.

The third thin-film magnetic head of the present invention comprises a lower magnetic core formed on a substrate, an upper magnetic core formed on the lower magnetic core with the medium of magnetic gap therebetween, and a coil interposed between the lower magnetic core and the upper magnetic core as insulated from the lower magnetic core and the upper magnetic core, and is characterized in that at least either of the lower magnetic core and the upper magnetic core comprises a front body of a magnetic pole facing a magnetic recording medium and a rear body of a magnetic pole having part thereof superposed on the front body of the magnetic pole and forms on the substrate a projection having a substantially convex shape wherein the rear body of the magnetic pole is connected at an angle of connection in the range of from 90 to 120 degrees to the front body of the magnetic pole.

In the above, the front body of the magnetic pole may be made of a magnetic material different from that of the rear body of the magnetic pole. For example, the front body of the magnetic pole has a small anisotropic magnetic field constant and the rear body of the magnetic pole has a large anisotropic magnetic field constant. Further the third thin-film magnetic head can also be improved by using a laminated construction having a non-magnetic layer interposed between a plurality of magnetic layers.

The third thin-film magnetic head mentioned above is further characterized in that the front body of the magnetic pole and the rear body of the magnetic pole are formed of magnetic materials embedded by collimation sputter by the use of a collimator of the shape of an orifice in the trench formed in advance in part of an insulating layer and also that the trench mentioned above is tapered with a smaller angle near the bottom parts of the lateral walls defining the trench than at the remaining parts of the lateral walls and is substantially provided with a taper of at least two steps.

Further, the thin-film magnetic head mentioned above, where the front part of the magnetic pole of the upper magnetic core and the front part of the magnetic pole of the lower magnetic core are both embedded, is characterized in that the trench for embedding the front part of the magnetic pole of the upper magnetic core is tapered with a smaller angle near the upper parts of the lateral walls defining the trench than at the remaining parts of the lateral walls and the trench for embedding the front part of the magnetic pole of the lower magnetic core is tapered with a smaller angle near the bottom parts of the lateral walls defining the trench than at the remaining parts of the lateral walls.

In the thin-film magnetic head of this invention, at least either of the lower magnetic core and the upper magnetic core is composed of a front body of the magnetic pole and a rear body of the magnetic pole held in contact with the front body of the magnetic pole in a plane. Thus, the thin-film magnetic head having a relatively low magnetic resistance at the contact portion, a uniform magnetic flux in the magnetic gap, uniform properties, and high repeatability and ease of manufacture can be easily produced. Further, a front body of the magnetic pole of at least either of the lower magnetic core and the upper magnetic core which are composed of the front body of the magnetic pole and the rear body of the magnetic pole is disposed on the same plane as at least part of the remainder of the choice between the lower magnetic core and the upper magnetic core. Thus, it become possible to deposit the magnetic material and simultaneously form those bodies, thereby the manufacturing process being simple. Further, in the thin-film magnetic head, the trench intended as the site for the formation of the front body of the magnetic pole can be fabricated with high accuracy because this trench is fabricated in a state perfectly free from any difference of level. It also contributes greatly to improve the accuracy of location of the front body of the magnetic pole because this front body of the magnetic pole having the shape of a substantially rectangular solid is formed by embedding a magnetic material by collimation sputter and the like by the use of a collimator of the shape of an orifice in the trench of the description given above. Further, the leading half part of the magnetic pole can be produced in high quality without entrapping any void. Owing to these features, the thin-film magnetic head permits highly accurate impartation thereto of a narrow track endowed with an extremely small tolerance.

This invention allows the front body of the magnetic pole and the rear body of the magnetic pole to be formed of mutually different magnetic materials.

For example, in case that to be faced an axis of easy magnetization to the track width direction is difficult due to a narrow track such as a track width of about 1 μm, this problem is solved by using a low HK magnetic material having a small anisotropic magnetic field constant as the material of the front body and a higher HK magnetic material having higher permeability in a high frequency region, preferably high resistant material as the material of the rear body. Particularly, the use of the above materials is effective in case of making the front body of the magnetic pole only by the embedding method. This is because when it is embedded the magnetic deterioration due to the disorder of crystal orientation is small in case of using the low HK material.

On the other hand, in case that to be faced an axis of easy magnetization to the track width direction is easy due to the process of a wider track, a magnetic material having a higher saturation magnetic flux density or a higher induced magnetic anisotropy may be used.

By having the rear body of the magnetic pole disposed as recessed from the face opposite the medium, the occurrence of leakage at the surface opposed to the medium of magnetic flux near the joint between the front body of the magnetic pole and the rear body of the magnetic pole at which the magnetic path assumes a nearly rectangular-bent structure can be precluded and, as a consequence, the accidental recording or regeneration due to the leakage of magnetic flux can be prevented. Further by having the rear body of the magnetic pole so superposed that it may form surface contact with the front body of the magnetic pole and even the rear end part thereof, the efficiency of the head and the noise such as of wiggle can be prevented from being adversely affected by a slight deviation to the head-depth direction of the site for the formation of the rear body of the magnetic pole. Since a polyimide type organic insulating material which does not exhibit very high patterning accuracy can be used in the place of a resist material as in the insulating layer for the coil, a magnetic material which has such a high saturation flux density as requires an annealing treatment to be performed at a temperature of about 350° C. is allowed to be used.

In the third thin-film magnetic head of the present invention, the project plane of either of the lower magnetic core or the upper magnetic core on the substrate, as shown in FIG. 15, has a nearly convex shape which is composed of a protuberant front body t of the magnetic pole connected to a rear body r of the magnetic pole at an angle (denoted by θ in the diagram) in the range of from 90 to 120 degrees. Thus, the axis of easy magnetization of the head can be stably paralleled to the direction of the track width even when the track width is decreased.

In the magnetic core which is shaped as shown in FIG. 15, the magnetic moment in the rear body r of the magnetic pole tends to assume its course along each side of the core as indicated by an arrow X. The axis of easy magnetization in the front body t of the magnetic pole which has undergone the decrease of track width is susceptible of the influence of the magnetic moment (indicated by a broken-line arrow $X_1$ in the diagram) directly connected to the in the superposed region of front body t of the magnetic pole and the rear body r of the magnetic pole.

Here, in the third thin-film magnetic head of the present invention, since the part of the magnetic moment $X_1$ which is exerted on the axis of easy magnetization of the front body t of the magnetic pole in the rear body r of the magnetic pole is caused to assume its course in the direction of the track width by restricting the angle of connection θ between the front body t of the magnetic pole and the rear body r of the magnetic pole within the range of from 90 to 120 degrees, the axis of easy magnetization (indicated by an arrow Y in the diagram) in the front body t of the magnetic pole which has undergone the decrease of track width can be directed to the track width. As a result, the thin-film magnetic head excelling in head characteristics, particularly in the high-frequency response characteristic, can be easily obtained with high repeatability. In contrast thereto, the conventional magnetic core which, as shown in FIG. 16, expands from a front part t' of the magnetic pole to a rear part r' of the magnetic pole after the fashion of a fan (θ>120 degrees), the magnetic moment of the front part t' of the magnetic pole tends to assume its course perpendicularly to the direction of its protuberance and the direction of track width as shown by an arrow Y in the diagram under the influence of the magnetic moment of the part directly connected to the front part t' of the magnetic pole in the rear part r' of the magnetic pole. As a natural consequence, the axis of easy magnetization of the front part t' of the magnetic pole inevitably assumes its course perpendicularly to the direction of track width.

Further, in case that at least a magnetic core is formed as a structure in which the front body of the magnetic pole and the rear body of the magnetic pole are formed in a laminated structure, the projected plane thereof on the substrate has also a nearly convex shape ($90 \leq \theta \leq 120$), but the effects mentioned above are more remarkable than the magnetic core in which the front part t' of the magnetic pole and the rear part r' of the magnetic pole are disposed on the same plane.

We will explain the reasons thereof as follows:

Conventionally, since magnetization in a soft magnetic member decreases its self-energy, magnetization in the periphery become in parallel with the surface of periphery, as shown in FIG. 17. When the magnetic member having a size of about 50 μm width×50 μm length×2 μm thickness, the magnetization exhibits a circulating magnetic domain structure. In this case, the axis of easy magnetization is in the direction of the track width.

On the other hand, the magnetic member having a size of about 2 μm width×5 μm length×2 μm thickness as the front body of the magnetic pole of the present invention does not exhibit a distinct magnetic domain structure, and occurs the curling of magnetization, as shown in FIG. 18. Nevertheless, the magnetization of the periphery become in parallel with the surface of the periphery because of decreasing the self demagnetization field energy, as shown in FIG. 18.

When superposing the rear body of the magnetic pole as shown in FIG. 17 on such front body of the magnetic pole and performing switched connecting the planes to be bond, as shown in FIG. 19, the magnetization in the connecting portion of the front body of the magnetic pole turns to the direction of the nearly track width because of affecting by the magnetization in the rear body of the magnetic pole. Accordingly, all magnetization in the front body of the magnetic pole can be turned to the direction of the track width on the whole. As a condition to obtain the above state, the effect becomes larger as the ratio (L2/L1 in FIG. 19) of the superposed portion in the front body of the magnetic pole increases. Further the effect can be obtained when the connecting angle θ between the front body of the magnetic pole and the rear body of the magnetic pole is in the range of about 90 to 120 degrees. Namely, the superposed structure of the front body of the magnetic pole and the rear body of the magnetic pole enables to more easily turn the axis of easy magnetization of the front part of the magnetic pole to the direction of the track width compared with the magnetic pole having no superposed portion even if the projected plane on the substrate has the same convex shape.

In the thin-film magnetic head of the present invention, the magnetic core which incorporates therein the front body of the magnetic pole and the rear body of the magnetic pole is formed as the first step by having a magnetic material embedded by collimation sputter by the use of a collimator of the shape of an orifice in a trench which is destined to serve as a site for the formation of the front body of the magnetic pole and the rear of the magnetic pole. As a result, the accuracy of positioning of the front body of the magnetic pole which has undergone the decrease of track width can be notably exalted and, at the same time, the magnetic core of the shape described above can be obtained in an ideal quality without entrapping any void therein. Further, the magnetic core can be formed in a state devoid of any difference of level. These features ensure impartation of a narrow track of high accuracy and very small tolerance, permit generation of a uniform magnetic flux density in the gap, and allow a head of uniform quality to be manufactured with high repeatability and great ease.

Further, in the thin-film magnetic head of this invention, in case that at least the front body of the magnetic pole is formed by having a magnetic material embedded by collimation sputter by the use of a collimator of the shape of an orifice in the trench formed in advance in part of the insulating layer, it is desirable to chamfer the upper outer edges of the lateral walls of the trench or the outer edges of the bottom surface of the trench. At that time, the trench is substantially provided with a taper of at least two steps. Thus, by the chamfering, the angle of the taper of the lateral walls near the bottom parts of the lateral walls or near the upper parts of the lateral walls is provided to be smaller than that of the remaining parts of the above parts of the lateral walls. As a result, the high-frequency permeability can be improved because the otherwise possible occurrence of a gross porosity during the embedment of the magnetic material by the collimation sputter can be completely prevented and because the magnetic anisotropy can be confined in the direction of track width. The trench which has the lateral walls having a taper of two or more steps can be easily produced by forming the insulating layer destined to contain the trench with two or more superposed films differing in etching grade and then etching the superposed films as by chemical etching or RIE.

Further, in this time, with respect to the upper magnetic core, the upper outer edges of the trench to form the front part of the magnetic pole is chamfered in such a manner that the taper angle near the bottom of the lateral walls is larger than the taper angle near the upper outer edges of the lateral walls. Further, with respect to the lower magnetic core, the outer edges of the bottom of the magnetic material in the front part of the magnetic pole is chamfered in such a manner that the taper angle near the upper outer edges of the lateral walls of the trench is larger than the taper angle of the lateral walls near the bottom of the trench. Thereby, the impartation of a track is accomplished with high accuracy.

Further, with respect to the front body of the magnetic pole of the upper magnetic core, when the taper angle near the bottom of the lateral walls of the trench is provided to be larger than the taper angle of the upper outer edges of the trench, the area of magnetic contact between the front body of the magnetic pole and the rear body of the magnetic pole can be enlarged and the magnetic path having small magnetic resistance can be formed.

A concrete thin-film magnetic head of the present invention is produced, for example, by the following steps of:

first, forming on a substrate sequentially a first insulating layer, an etching stopper layer, a second insulating layer, a polishing stopper layer, an etching mask, and a third insulating layer, forming the a resist mask on the third insulating layer a portion for the formation of a trench for embedding therein a magnetic pole proper of a lower magnetic core, then forming the trench for embedding therein the magnetic pole proper by sequentially etching the third insulating layer, the etching mask, the polishing stopper layer, the second insulating layer, the etching stopper layer, and the first insulating layer, depositing a magnetic material by collimation sputter in the trench for embedding the lower magnetic pole proper, removing the excess magnetic material by polishing and/or etching back thereby enabling the portions of the third insulating layer, the etching mask, and the magnetic layer falling outside the trench to be flush with the polishing stopper layer, forming on the surface including the magnetic layer sequentially a magnetic gap layer, a fourth insulating layer, a second polishing stopper layer, and a fifth insulating layer, forming a second resist mask on a predetermined region, then removing by etching the fifth insulating layer, the second polishing stopper layer, and the fourth insulating layer thereby forming a trench for embedding a front body of a magnetic pole of a upper magnetic core and a trench for embedding a rear body of the magnetic pole of the lower magnetic core, depositing by collimation sputter a magnetic material in the trench for embedding the front body of the magnetic pole and the trench for embedding the rear body of the magnetic pole, removing by polishing or etching back the excess magnetic material thereby enabling the portions of the fifth insulating layer, the magnetic layer, and the second polishing stopper layer falling outside the trenches mentioned above to be flush with the second polishing stopper layer, forming the front body of the magnetic pole and the rear body of the magnetic pole, forming an insulating layer having a coil embedded in a plane including the front body of the magnetic pole, further forming a magnetic layer destined to serve as a rear body of the magnetic pole on part of the surface of the front body of the magnetic pole of the upper magnetic core and the insulating layer having the coil embedded therein, and forming a protective layer on the surface including the magnetic layer destined to serve as the rear body of the magnetic pole.

DESCRIPTION OF THE PREFERRED EMBODIMENTS

Now, the embodiments of this invention will be described below with reference to the annexed drawings.

Embodiment 1

Figure 1:
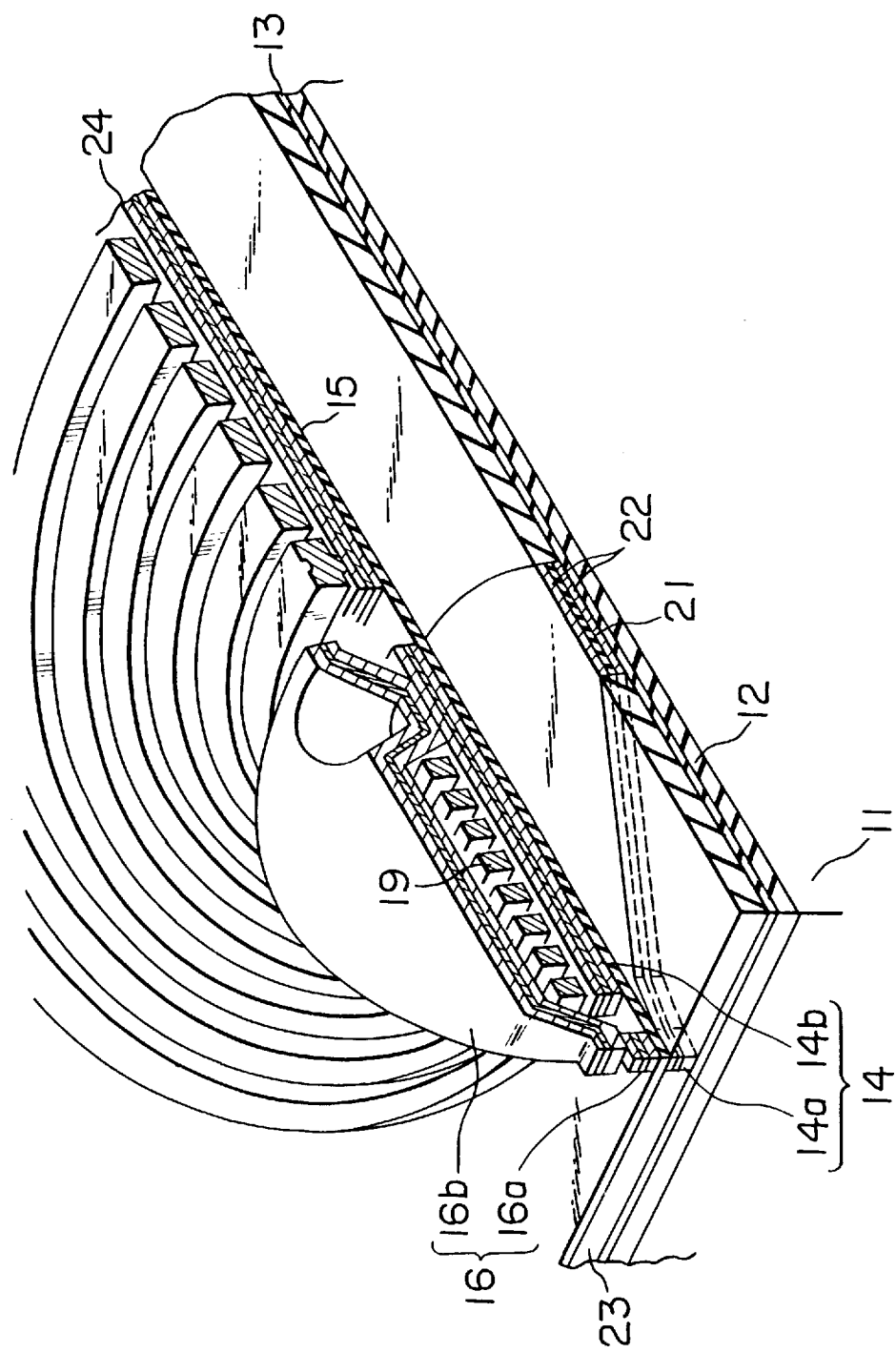
FIG. 1 is a partially sectioned perspective view schematically illustrating the construction of a thin-film magnetic head obtained in Embodiment 1 of this invention.
Figure 2:
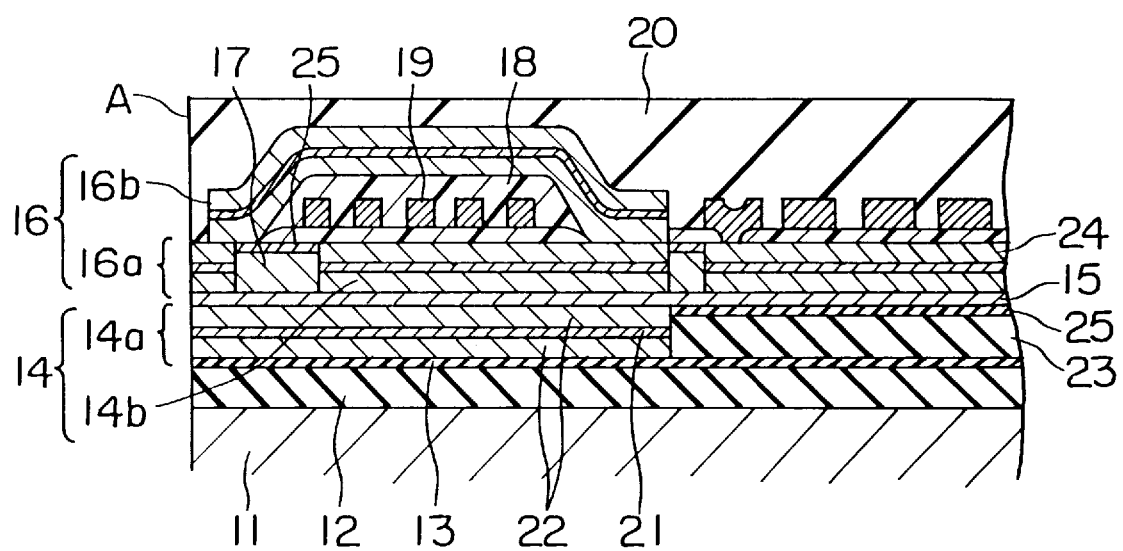
FIG. 2 is a longitudinal cross section of the thin-film magnetic head of Embodiment 1 of this invention illustrated in FIG. 1.

FIG. 1 and FIG. 2 are diagrams severally illustrating the construction of the essential part of a thin-film magnetic head according to Embodiment 1 of this invention; FIG. 1 being a partially sectioned perspective view schematically illustrating the construction of the thin-film magnetic head and FIG. 2 a longitudinal cross section thereof.

In these diagrams, 11 stands for a substrate which is made of $Al_2O_3$.TiC. On this substrate 11, a magnetic pole proper 14a of a lower magnetic core 14 formed with a laminated magnetic material of CoZrNb is superposed through the medium of an insulating layer 12 made of $Al_2O_3$ and an etching stopper layer 13. On the magnetic pole proper 14a, a magnetic gap 15 made $Al_2O_3$ and concurrently serving as an etching stopper layer is formed.

On this magnetic gap 15 on the side of the surface thereof opposite a medium, a front body 16a of a magnetic pole of an upper magnetic core 16 formed with a laminated magnetic material of CoZrNB is superposed. The front body 16a of the magnetic pole has substantially the shape of a rectangular solid. At the back of the front body 16a of the magnetic pole, a rear auxiliary body 14b of the lower magnetic core 14 which is magnetically isolated by an insulating layer 17 is formed. On the layers mentioned above, a coil 19 made of Cu and embedded in an insulating layer 18 made of polyimide is formed.

On the insulating layer 18, a rear body 16b of a magnetic pole of the upper magnetic core 16 held in partly surface contact in a plane with the front body 16a of the upper magnetic pole is disposed in a laminated structure. Then, a protective layer 20 made of $Al_2O_3$ is superposed on the front body 16a of the magnetic pole and the rear body 16b of the magnetic pole to complete the formation of the essential part of an electromagnetic transducer of the thin-film magnetic head.

The magnetic pole proper 14a of the lower magnetic core 14 and the rear auxiliary body 14b of the magnetic pole and the front body 16a of the magnetic pole of the upper magnetic core 16 and the rear body 16b of the magnetic pole as well are invariably in such a construction as to have laminated magnetic layers 22 of CoZrNb joined to each other through the medium of a nonmagnetic layer 21 made of $Al_2O_3$. An insulating layer 23 made of $SiO_2$ is disposed around the magnetic pole proper 14a so as to fix the position for the formation thereof. At the back of the rear auxiliary body 14b, a coil drawer line 24 made of the same material as the rear auxiliary body is disposed. Further, polishing stopper layers 25 are disposed one each on the insulating layers 17 and 23.

Now, the process for producing the thin-film magnetic head constructed as described above will be explained below with reference to FIG. 3 and FIG. 4.

Figure 3A:
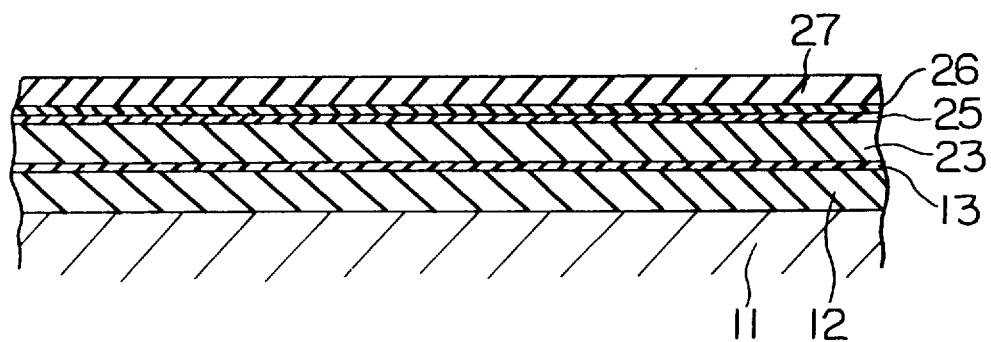
FIG. 3A, FIG. 3B and FIG. 3C are a series of longitudinal cross sections depicting part of a process for the manufacture of the thin-film magnetic head indicated in Embodiment 1 of this invention.

First, the insulating layer 12 having a thickness of about 5 $\mu$m and made of $Al_2O_3$, the etching stopper layer 13 having a thickness of about 0.1 $\mu$m, the insulating layer 23 having a thickness of about 3 $\mu$m and made of $SiO_2$, the polishing stopper layer 25 having a thickness of about 0.1 $\mu$m and made of $Al_2O_3$, an etching mask 26 having a thickness of about 0.2 $\mu$m, and an insulating layer 27 having a thickness of about 0.5 $\mu$m and made of $SiO_2$ are superposed on the substrate 11 as shown in FIG. 3A. The insulating layer 27 in this case is destined to discharge the part of stock for cutting at the subsequent step of polishing.

The etching stopper layer 13 and the etching mask 26 mentioned above are desired to be made of a material which is etched slowly by a fluorine type reactive gas. Concrete examples of the material of this description include $Al_2O_3$, C, Al, Ti, Cr, W, Nb, and Si. The polishing stopper layer 25 is desired to be made of such a material as $Al_2O_3$ which is not easily removed by polishing.

Figure 3B:
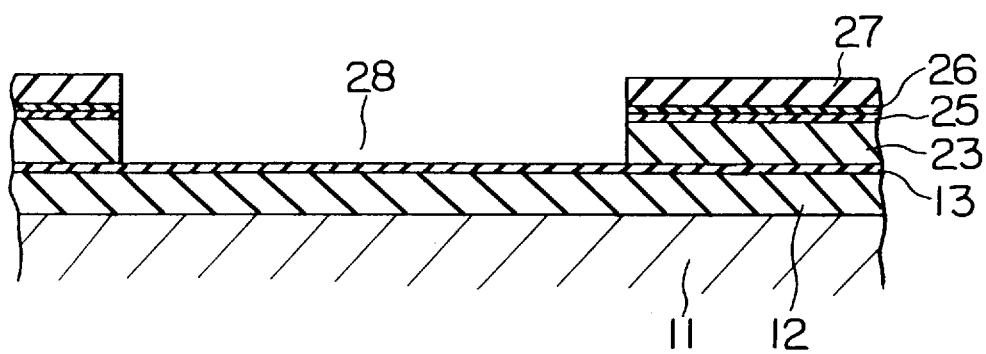

After a resist mask (not shown) is subsequently superposed on the flat smooth insulating layer 27, the insulating layer 27 is etched with such an etching gas as $CF_4$, then the etching mask 26 with such a gas as $O_2$, subsequently the polishing stopper layer 25 with a gas prepared by adding argon as to $CF_4$, and finally the insulating layer 23 with such a gas as $CF_4$ by means of RIE (reactive ion etching). Thereafter, the resist mask is removed to obtain a trench 28 for embedding the magnetic pole proper 14a as shown in FIG. 3B.

In this case, since the etching mask 26 is already formed as described above, the lateral walls to define the trench 28 may be cut perpendicularly or may be converged or diverged in the direction of depth. Further, owing to the presence of the etching stopper layer 13, the depth of the embedding trench 28 can be accurately controlled and the shapes of the bottom edges of this trench 28 can be controlled as well by dint of suitable excessive etching. The bottom edges of the trench 28 may be curved with a suitable radius or may be cut substantially rectangularly, for example.

Figure 3C:
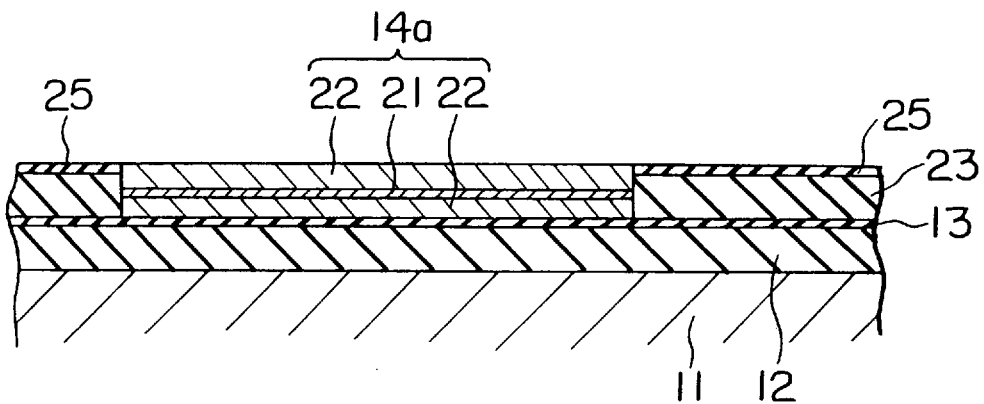

Then, inside the trench 28, the materials which go to form a laminated magnetic material for the magnetic pole proper 14a, namely the magnetic layer 22 made of CoZrNb and the nonmagnetic layer 21 made of $Al_2O_3$ are sequentially deposited as by collimation sputter as shown in FIG. 3C. Subsequently, the extraneous remnant, if any, from the deposition are removed from the trench 28 as by polishing or etching back to complete the formation of the magnetic pole proper 14a.

When the bottom edges of the trench 28 were smoothly curved with a radius at the preceding step, the magnetic characteristics in the edge parts of the magnetic layer 14a to be embedded can be easily controlled at the current step. The two polishing stopper layers 25 made of such a material as $Al_2O_3$ which is not easily removed by polishing are disposed each on the opposite sides of the upper surface of the magnetic pole proper 14a. If the polishing work proceeds in a more or less inclined direction during the step of polishing, therefore, the polishing stopper layers 25 will function as a stopper and serve the purpose of correcting the inclination and consequently permit control of the thickness of the magnetic pole proper 14a.

Figure 4A:
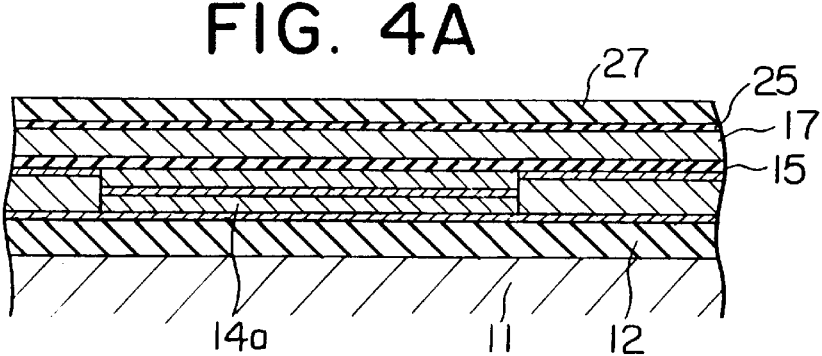
FIG. 4A, FIG. 4B, FIG. 4C and FIG. 4D are a series of longitudinal cross sections depicting a process following the process for the manufacture of the thin-film magnetic head illustrated in FIG. 3.
Figure 4B:
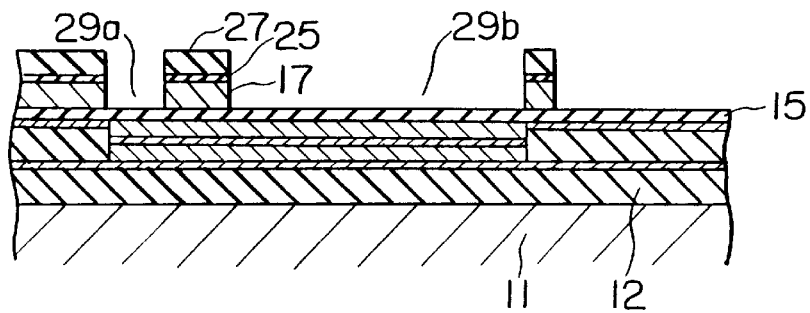

Then, the magnetic gap 15 having a thickness of about 0.1 μm, the insulating layer 17 having a thickness of about 3 μm, the polishing stopper layer 25 having a thickness of about 0.1 μm, and the insulating layer 27 intended as stock for cutting and having a thickness of about 0.5 μm are sequentially superposed on the magnetic pole proper 14a as shown in FIG. 4A. The materials to be used for the layers herein are the same as those of the layers involved in the process shown in FIG. 3A. After the resist mask is subsequently formed, the insulating layer 27 as the stock for cutting, the polishing stopper layer 25, and the insulating layer 17 are etched in the same manner as in the process described above. In consequence of this etching operation, a trench 29a for embedding the front body 16a of the magnetic pole and a trench 29b for embedding the rear auxiliary body 14b of the magnetic pole are obtained as shown in FIG. 4B. In the formation of these trenches 29, the lateral walls to define the trenches can be formed in a desired shape in the same manner as in the process described above.

The magnetic gap 15 is intended to serve concurrently as an etching stopper layer during the etching operation mentioned above and, therefore, is desired to be made of such a material as $Al_2O_3$, for example, which is etched slowly by a fluorine type reactive gas and is capable of functioning as a magnetic gap. The fact that the magnetic gap 15 concurrently fulfills the part of an etching stopper layer as described above contributes to exalt the yield because the gap retains its size intact even when the etching work involved in the formation of the trench for the front body 16a of the magnetic pole is carried out more or less excessively. In this case, it is optional with the manufacturer to overlay the gap preparatorily with an etching stopper made of C, then forming the trench, and thereafter removing the etching stopper of C as by means of an $O_2$ plasma thereby exposing the gap.

Figure 4C:
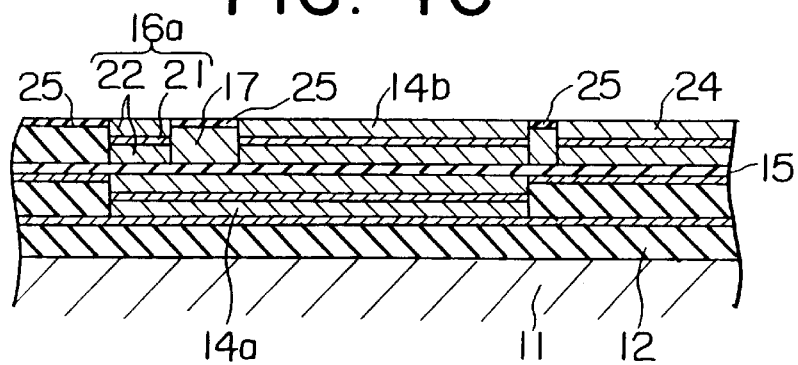
Figure 4D:
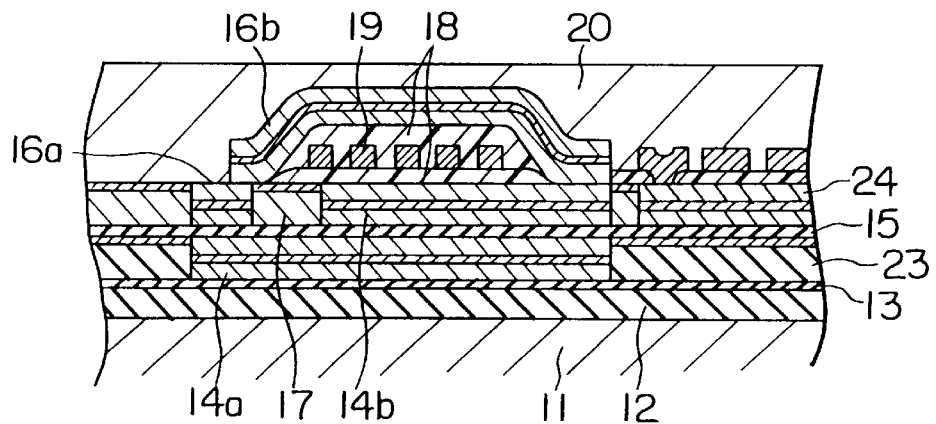

Then, the materials for forming a two-layer laminated magnetic layers (22/21/22) are deposited by the collimation sputter inside each of the trenches 29a, 29b as shown in FIG. 4C, then the extraneous remnant, if any, from the sputtering is removed by polishing or etching back, and the front body 16a of the magnetic pole and the rear auxiliary body 14b of the magnetic pole both having substantially the shape of a rectangular solid are formed by embedding. In the present embodiment, the coil drawer line 24 is simultaneously formed by embedding. The fact that the front body 16a of the magnetic pole, the rear auxiliary body 14b of the magnetic pole, and further the coil drawer line 24 are formed simultaneously by embedding permits a generous cut in the number of man-hours to be involved.

Then, the insulating layer 18 made of polyimide resin and having embedded therein the coil 19 made of Cu is superposed on the front body 16a of the magnetic pole and the rear auxiliary body 14b of the magnetic pole. The two-layer laminated magnetic material destined to serve as the rear body 16b of the magnetic pole and the protective layer 20 made of $Al_2O_3$ are further superposed thereon to complete the formation of the electromagnetic transducer of the thin-film magnetic head of this invention. In the process described above, the magnetic gap 15 may be formed as by means of the collimation sputter before the laminated magnetic material destined to form the front body 16a of the magnetic pole and the rear auxiliary body 14b of the magnetic pole is shaped by the collimation sputter.

In accordance with the construction and the method for production of the thin-film magnetic head of the embodiment described above, a narrow track having a width of not more than 1 μm can be imparted to the head at a tolerance (3σ) within ±0.1 μm with high accuracy and high repeatability because the front body 16a of the magnetic pole having substantially the shape of a rectangular solid is formed by embedding the component materials for the laminated magnetic material inside the trench 29a formed of the insulating layer 17. Specifically, the positional accuracy of the front body 16a of the magnetic pole can be markedly exalted because the trench 29a destined to serve as the site for the formation of the front body 16a is shaped in a state devoid of difference of level. Then, since the front body 16a of the magnetic pole having substantially the shape of a rectangular solid is formed by embedding the magnetic material by means of the collimation sputter inside the trench 29a, it can be obtained in high quality without entrapping any void therein in a highly accurately positioned state.

The front part of the magnetic pole is enabled to tolerate a heat treatment at elevated temperatures up to about 500° C. because it is wholly formed of an inorganic material excelling in resistance to heat and, at the same time, it is completely formed before the insulating layer 18 and the like in which the coil 19 is to be embedded are formed. As a result, the uniaxial anisotropy having only small dispersion of anisotropy can be imparted to the magnetic material having a high saturation flux density. Further, in the thin-film magnetic head mentioned above, the thickness of the magnetic layer 22 can be decreased and the axis of easy magnetization can be parallelized with the track width even when the track is formed in a decreased width because the two-layer laminated magnetic material incorporating therein the nonmagnetic layer 21 made of $Al_2O_3$ is used for the lower magnetic core 14 and the upper magnetic core 16. This laminated magnetic material fully manifests the expected effect so long as the number of component layers which form the laminate is at least three.

Besides, in the thin-film magnetic head of the present embodiment, the initial part of taper of the insulating layer 18 having the coil 19 embedded therein is set behind the rear end part of the front body 16a of the magnetic pole and the rear body part 16b of the magnetic pole is held in surface contact in a plane with the rear end part of the front body 16a of the magnetic pole and is bent on the backward side from the rear end part of the front body 16a of the magnetic pole. Owing to this very arrangement, the head can be obtained in uniform quality with high efficiency because the front body 16a of the magnetic pole and the rear body 16b of the magnetic pole are allowed to retain their surface contact intact even when the point of bend is more or less deviated. Further, the thorough surface contact serves the purpose of precluding the otherwise possible occurrence of noise as of wiggle. These features allow a polyimide type organic insulating material having no very satisfactory patterning accuracy to be used in the place of a resist material for the insulating layer 18 and permit adoption of a magnetic material having a high saturation flux density and consequently necessitating an annealing treatment in the neighborhood of 350° C.

Figure 5:
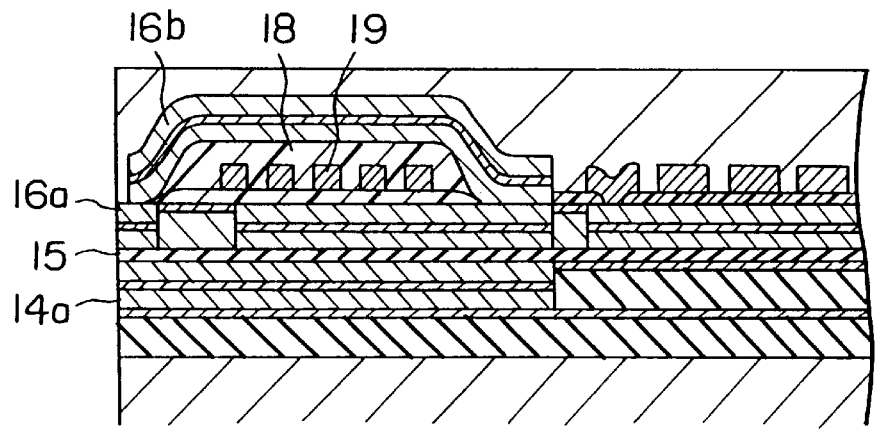
FIG. 5 is a longitudinal cross section of another thin-film magnetic head explained in comparison with the thin-film magnetic head of Embodiment 1 illustrated in FIG. 2.

If the initial part of taper of the insulating layer 18 is set nearer to the surface opposite the medium than to the rear end part of the front body 16a of the magnetic pole as shown in FIG. 5, for example, the area of contact between the front body 16a of the magnetic pole and the rear body 16b of the magnetic pole is decreased possibly to the extent of not merely degrading the efficiency but also inducing misalignment capable of greatly aggravating the degradation of efficiency and further breaking the uniformity of product quality.

Figure 6A:
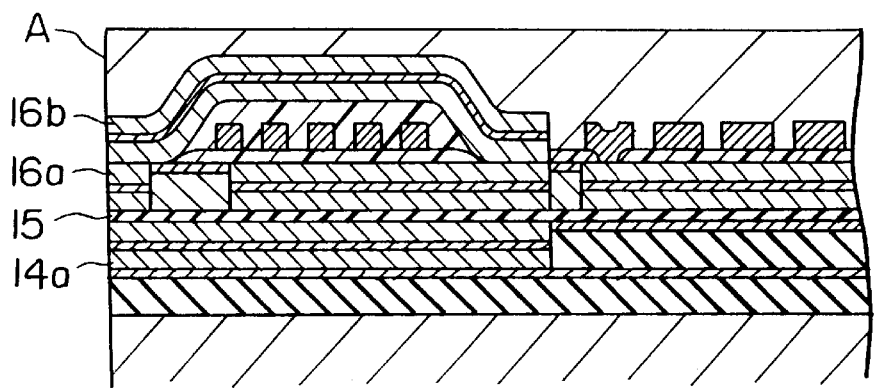
FIG. 6A is a detailed cross section of still another thin-film magnetic head explained in comparison with the thin-film magnetic head of Embodiment 1 illustrated in FIG. 2.
Figure 6B:
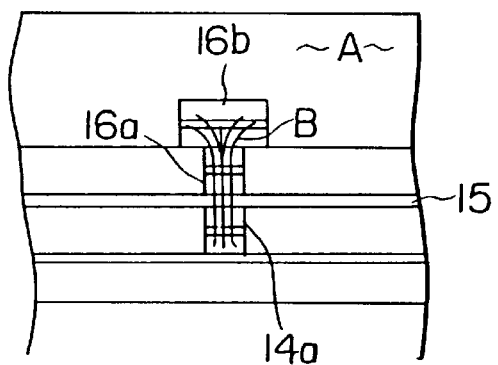
FIG. 6B is an explanatory diagram of the flow of a magnetic flux in another thin-film magnetic head explained in comparison with the thin-film magnetic head of Embodiment 1 illustrated in FIG. 2.

Further, in the thin-film magnetic head of the present embodiment, the possible occurrence at the surface opposite the medium to the medium of leakage of magnetic flux near the point of contact between the front body 16a of the magnetic pole and the rear body 16b of the magnetic pole in which the magnetic material assumes an incontinuously bent form can be prevented because the front end part of the rear body 16b of the magnetic pole is disposed as recessed from the surface opposite the medium (indicated by A in the diagram). As a result, the adverse effects of the leakage of magnetic flux at the surface opposite the medium on the operations of recording and regeneration can be eliminated. If the end part of the rear body 16b of the magnetic pole is extended to the surface opposite the medium as shown in FIG. 6A, for example, the leakage of magnetic flux at the surface opposite the medium (indicated by B in the diagram) occurs conspicuously as shown in FIG. 6B, with the possible result that the recording will be attained not merely between tracks but also across adjacent tracks. Further, during the course of the regeneration, the leakage goes to aggravate the stroke noise. On the other hand, these adverse effects can be eliminated by causing the rear body 16b of the magnetic pole to be recessed from the surface opposite the medium.

In the construction of the present invention described above, if the surface of contact between the rear body 16b of the magnetic pole and the front body 16a of the magnetic pole is not a perfect plane as when this surface of contact contains rises and falls, the magnetic flux is swelled across this surface of contact and is no longer allowed to flow easily. Thus, the magnetic flux of required quality is obtained only with difficulty.

The embodiment described above represents a case of embedding the magnetic material by sputtering in the trench of SiO$_2$ formed by means of RIE. It is optional with the manufacturer to adopt instead a conventional procedure which comprises first forming a film of the magnetic material, then shaping the magnetic material by means of ion milling or RIE, and subsequently overlaying the shaped magnetic material with the insulating layer and polishing back the coated magnetic material. This procedure, however, impairs the accuracy of track width, though to a slight extent.

Embodiment 2

Now, another embodiment of this invention will be described below with reference to FIGS. 7.

Figure 7:
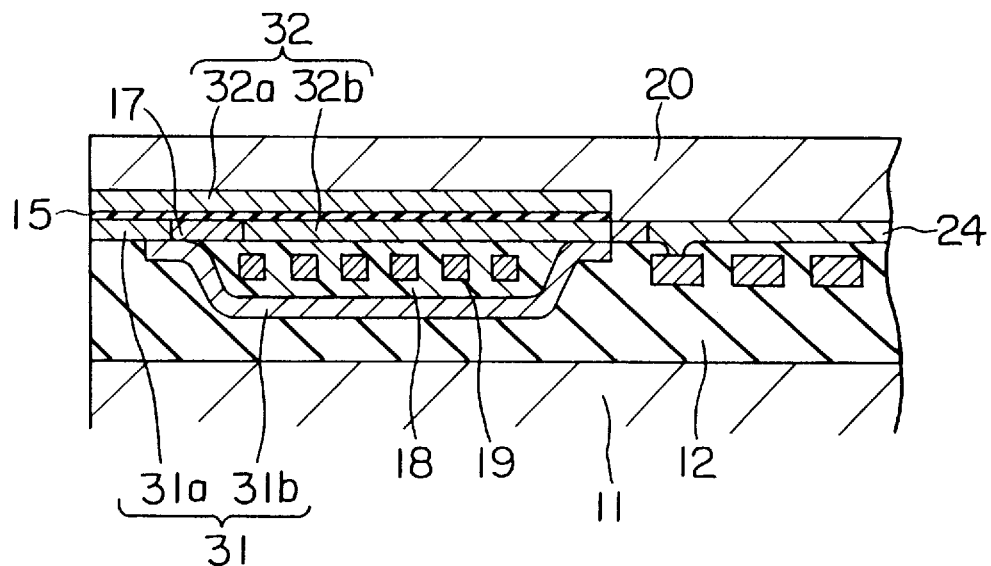
FIG. 7 is a longitudinal cross section illustrating the construction of a thin-film magnetic head obtained in Embodiment 2 of the present invention.

FIG. 7 illustrates a thin-film magnetic film which has a lower magnetic core 31 composed of a front body 31a of a magnetic pole having substantially the shape of a rectangular solid and a rear body 31b of the magnetic pole held in surface contact in a plane with the front body 31a of the magnetic pole. Specifically, the front body 31b of the magnetic pole of the lower magnetic core and the insulating layer 18 having the coil 19 embedded therein are formed as embedded in the insulating layer 12. On these layers, a rear auxiliary body 32b of an upper magnetic core 32 magnetically isolated by the insulating layer 17 from the front body 31a of the magnetic pole of the lower magnetic coil and the coil drawer line 24 are superposed so as to be flush with each other. A magnetic pole proper 32a of the upper magnetic core 32 is superposed further thereon through the medium of the magnetic gap 15. The protective layer 20 is superposed on the upper magnetic pole proper 32a to complete the formation of the essential part of the electromagnetic transducer of the thin-film magnetic head.

In the thin-film magnetic head of the present embodiment, similarly to the embodiment described previously, the front body 31a of the magnetic pole having substantially the shape of a rectangular solid is manufactured by forming a trench for embedding the front body 31a of the magnetic pole with the insulating layer 17, embedding a magnetic material by collimation sputter inside the trench, and then removing the extraneous remnant, if any, from the sputtering as by polishing. Though FIG. 7 omits such component layers as the polishing stopper layer and the etching stopper layer from illustration, they may be formed as occasion demands similarly to the embodiment described previously. While the magnetic cores are depicted as severally formed with a single layer for the sake of simplicity of illustration, they may be formed of a laminated magnetic material in the same manner as in the embodiment described previously. This remark holds good for the following embodiments.

In the thin-film magnetic head of the embodiment described above, since the front body 31a of the magnetic pole having substantially the shape of a rectangular solid is manufactured by causing the magnetic material to be embedded by means of the collimation sputter within the trench formed as of the insulating layer 17, the relevant parts can be shaped in a state devoid of any difference of level. Thus, the head enables a narrow track of extremely small tolerance to be imparted thereto with high accuracy and repeatability. The other effects of the head are likewise satisfactory. Further, in terms of the process of manufacture, the present embodiment permits a generous cut in the number of man-hours to be involved because the front body 31a of the magnetic pole, the rear auxiliary body 32b of the magnetic pole, and the coil drawer line 24 are simultaneously formed by one and the same embedding operation.

Embodiment 3

Figure 8:
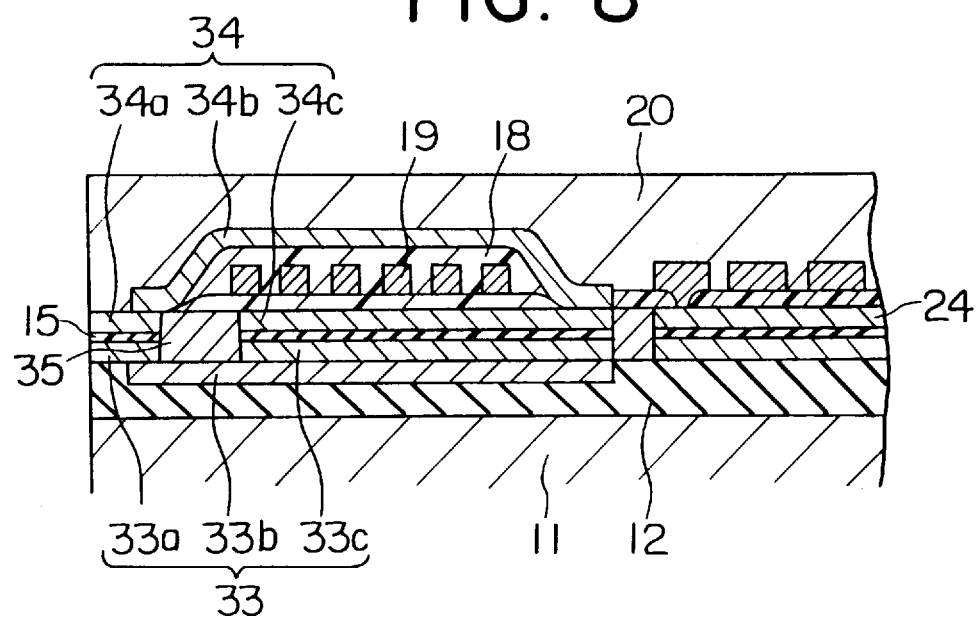
FIG. 8 is a longitudinal cross section illustrating the construction of a thin-film magnetic head obtained in Embodiment 3 of the present invention.

FIG. 8 illustrates a thin-film magnetic head having a lower magnetic core 33 and an upper magnetic core 34 respectively composed of front bodies 33a, 34a of a magnetic pole having substantially the shape of a rectangular solid and rear bodies 33b and 34b of the magnetic pole held in surface contact in a plane with the front bodies 33a, 34a of the magnetic pole. Specifically, on the insulating layer 12 is superposed the rear body 33b of the magnetic pole of the lower magnetic coil. The front body 33a of the magnetic pole of lower magnetic coil and a rear auxiliary body 33c of the magnetic pole of the lower magnetic coil are superposed further thereon. The front body 34a of the magnetic pole of the upper magnetic core and a rear auxiliary body 34c of the magnetic pole of the lower magnetic coil and the coil drawer line 24 are superposed through the medium of the magnetic gap 15 on the front body 33a of the magnetic pole of the lower magnetic coil and the rear auxiliary body 33c of the magnetic pole of the lower magnetic coil. Then, in the same manner as in the first embodiment, the insulating layer 18 having the coil 19 embedded therein, the rear body 34b of the magnetic pole of the upper magnetic coil so formed as to overlie the insulating layer 18, and the protective layer 20 are further superposed to complete the formation of the essential part of the electromagnetic transducer of the thin-film magnetic head.

Figure 9A:
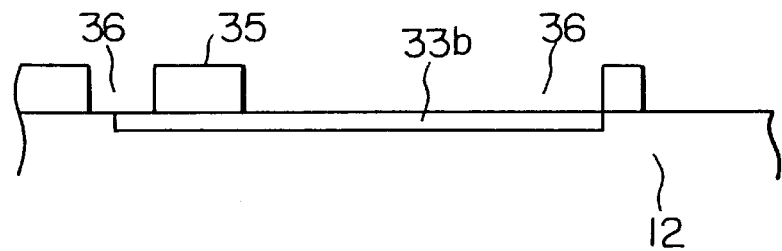
FIG. 9A, FIG. 9B and FIG. 9C are a series of longitudinal cross sections to aid in the explanation of a process for the production of the essential part of the thin-film magnetic head of Embodiment 3 of this invention.
Figure 9B:
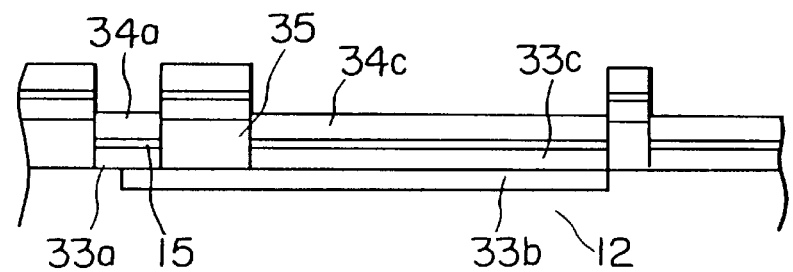

The thin-film magnetic head having the construction described above is manufactured, for example, as follows. An insulating layer 35 is superposed on the rear body 33b of the magnetic pole formed on the insulating layer 12 and a trench 36 is incised in the insulating layer 35 as by means of RIE as shown in FIG. 9A. During the incision of the trench, the walls defining the trench are either perpendicularly cut or slightly diverged in the direction of depth and are suitably etched excessively to provide the trench 36 with substantially rectangular bottom edges.

Figure 9C:
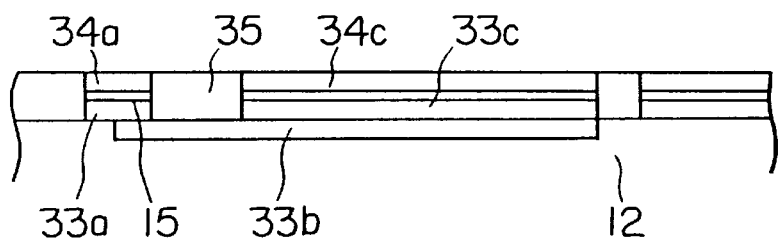

Then, with the collimator so adjusted as to eject sputter particles in a direction substantially parallel with the lateral walls of the trench 36, the magnetic material to form the lower magnetic core 33, the material to form the magnetic gap 15, and the magnetic material to form the upper magnetic core 34 are continuously sputtered by the collimator into the same trench 36. Then, by polishing back the resultant product of sputtering, the front bodies 33a, 34a and the rear auxiliary bodies 33c, 34c respectively of the magnetic poles are formed as shown in FIG. 9C.

By constructing the lower magnetic core 33 and the upper magnetic core 34 so as to be provided respectively with the front bodies 33a and 34a of the magnetic pole and, at the same time, continuously manufacturing the upper and lower front bodies 33a and 34a of the magnetic pole in one and the same embedding process as described above, the otherwise possible misalignment of the upper and lower front bodies 33a and 34a of the magnetic pole can be perfectly prevented. As a result, the upper and the lower pole in the produced head have identical widths and are perfectly aligned with each other. As a natural consequence, the burden of side righting by means of side fringing can be minimized and the track pitch can be decreased.

As respects the process of manufacture involved in the embodiment described above, the number of man-hours required for the manufacture can be notably cut because the upper and lower front bodies 33a and 34a of the magnetic pole, the rear auxiliary bodies 33c and 34c of the magnetic poles, the magnetic gap 15, and the coil drawer line 24 are simultaneously manufactured in one and the same embedding process.

Embodiment 4

Figure 10:
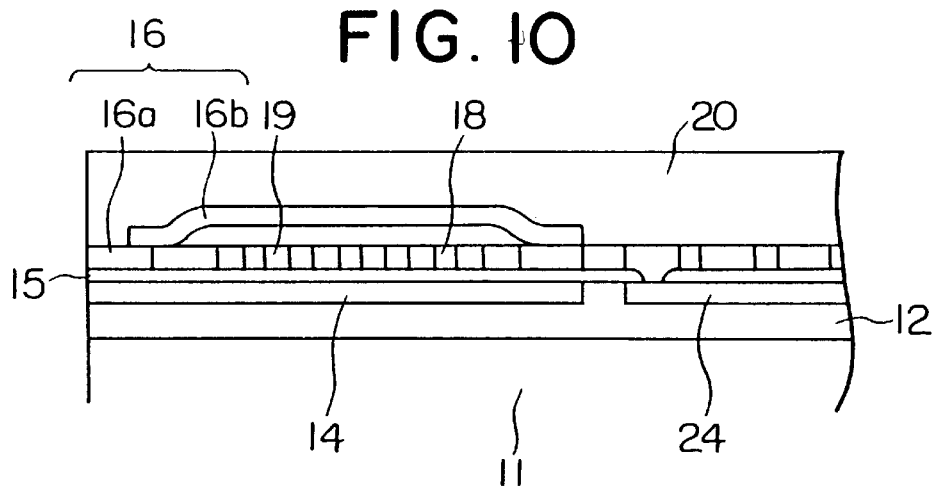
FIG. 10 is a longitudinal cross section illustrating the construction of a thin-film magnetic head obtained in Embodiment 4 of the present invention.
Figure 11:
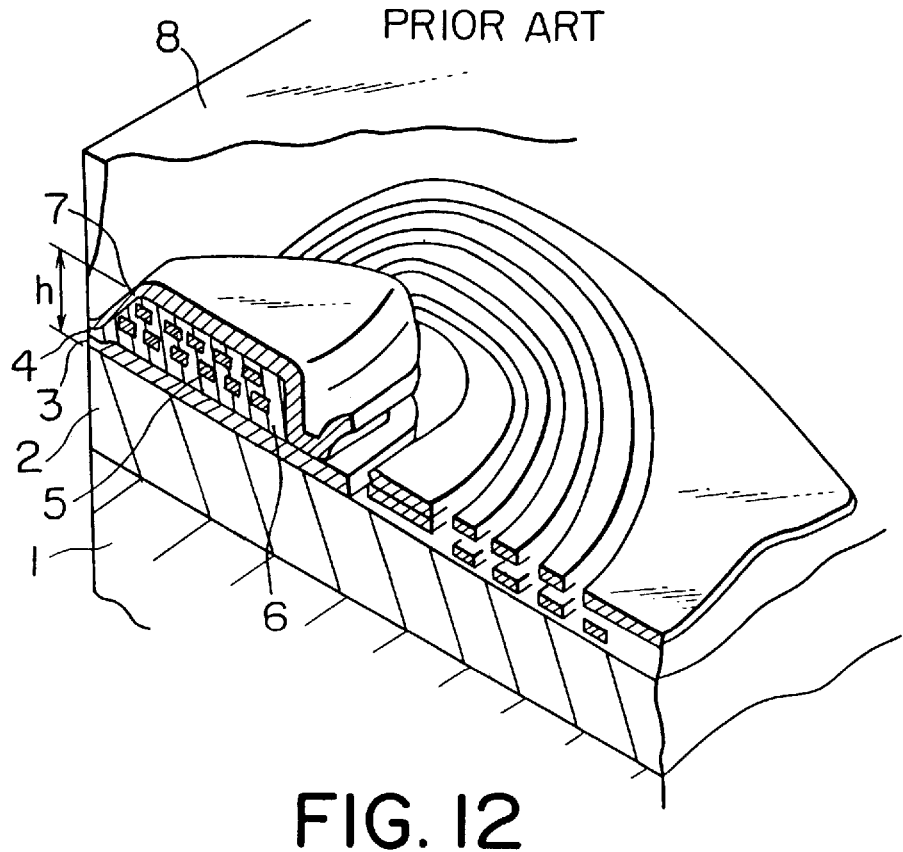
FIG. 11 is a partially sectioned perspective view depicting the construction of a conventional thin-film magnetic head.
Figure 12:
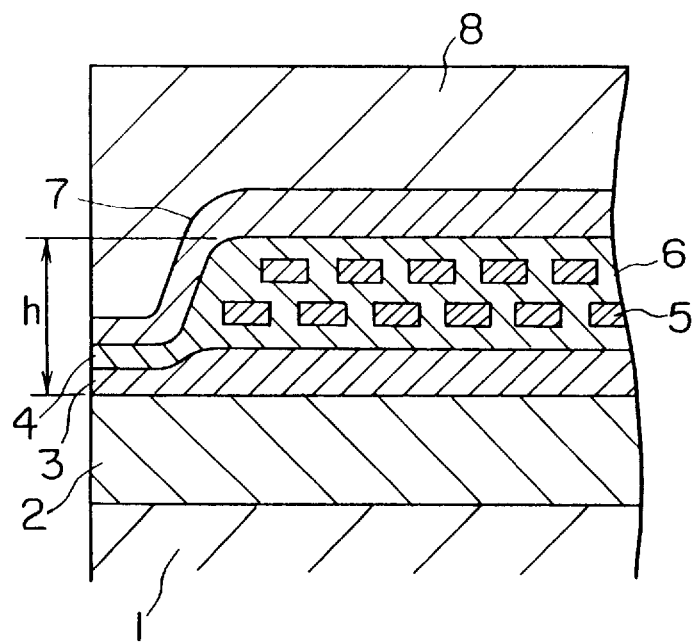
FIG. 12 is a longitudinal cross section of the conventional thin-film magnetic head illustrated in FIG. 11.
Figure 13:
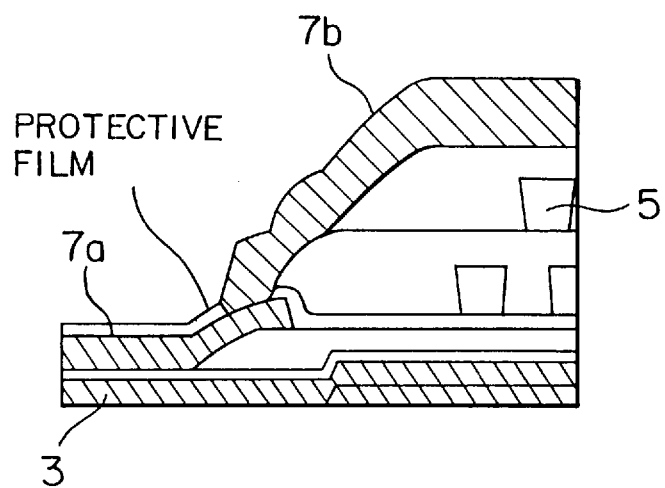
FIG. 13 is a longitudinal cross section illustrating another example of the construction of the conventional thin-film magnetic head.

FIG. 10 illustrates a case of simultaneously manufacturing the coil 19 and the front body 16a of the magnetic pole of the upper magnetic coil with one and the same material in one and the same embedding process and simultaneously manufacturing the coil drawer line 24 and the lower magnetic core 14 with one and the same material in one and the same embedding process. This procedure permits a marked cut in the number of man-hours involved in the operation. The head produced in this case satisfactorily fulfills its function so long as it is used exclusively for recording. When pure iron is used as the material under discussion, the specific resistance can be confined to 15 $\mu\Omega\cdot$cm. It is optional with the manufacturer to produce the coil and the front body of the magnetic pole of the lower magnetic coil with one and the same material in one and the same embedding process.

Embodiment 5

Figure 14:
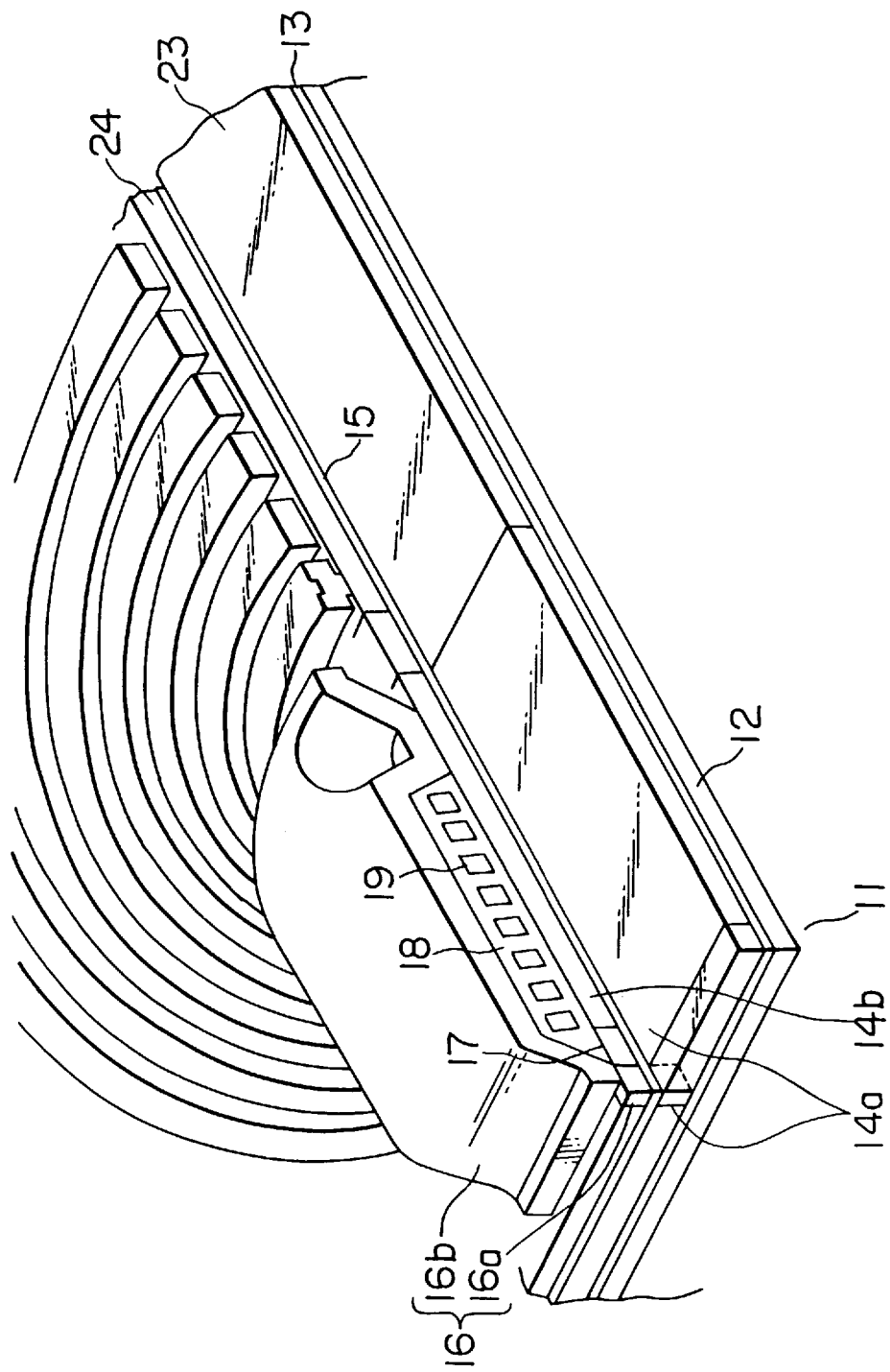
FIG. 14 is a partially sectioned perspective view schematically illustrating the construction of a thin-film magnetic head obtained in Embodiment 5 of the present invention.
Figure 15:
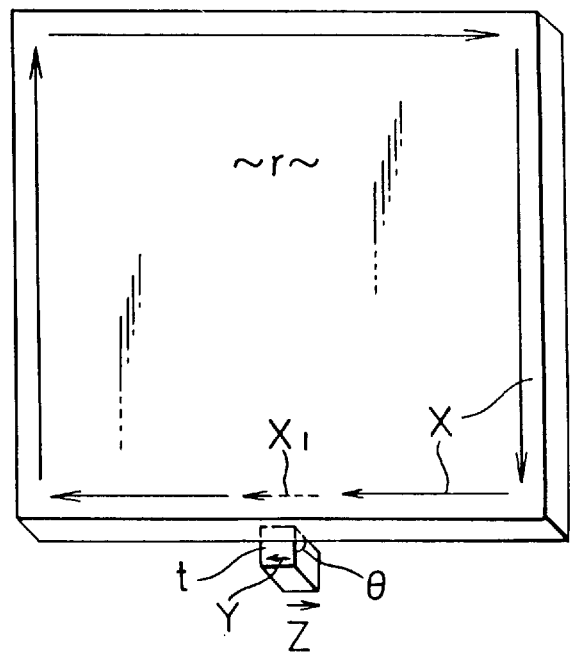
FIG. 15 is a diagram to aid in the explanation of the axis of easy magnetization of the front body of a magnetic pole in the thin-film magnetic head of Embodiment 5 of this invention illustrated in FIG. 14.

FIG. 14 is a partially sectioned perspective view schematically illustrating the construction of the essential part of a thin-film magnetic head according to Embodiment 5 of the present invention.

In this diagram, 11 stands for a substrate which is made as of $Al_2O_3$.TiC. On this substrate 11, a magnetic pole proper 14a of a lower magnetic core 14 made of such a magnetic material as CoZrNb, for example, is superposed through the medium of an insulating layer 12 made of $Al_2O_3$ and an etching stopper layer 13. The magnetic pole proper 14a which has a substantially convex shape is composed of a front part of the magnetic pole proper having substantially the shape of a rectangular solid corresponding to the convex projecting part and a rear part of the magnetic pole proper. The front part of the magnetic pole proper and the rear part of the magnetic pole proper are formed continuously on one and the same plane. On the magnetic pole proper 14a is superposed a magnetic gap 15 which is made of $Al_2O_3$ and intended to serve concurrently as an etching stopper layer.

On the magnetic gap 15 on the side of the surface thereof opposite the medium, a front body 16a of an magnetic pole of an upper magnetic core 16 made of such a magnetic material as CoZrNb is superposed. The front body 16a of the magnetic pole has substantially the shape of a rectangular solid. Behind the back of the front body 16a of the magnetic pole, the rear auxiliary body 14b of the magnetic pole of a lower magnetic coil 14 magnetically isolated by an insulating layer 17 is formed. On these layers, a coil 19 made of Cu and embedded in an insulating layer 18 made of polyimide is superposed.

On the insulating layer 18, a rear body 16b of the magnetic pole of the upper magnetic core 16 held in surface contact in a plane with the front body 16a of the upper magnetic pole is superposed. The front body 16a of the magnetic pole and the rear body 16b of the magnetic pole, as viewed in a planar aspect, are so shaped that, similarly to the magnetic pole proper 14a mentioned above, the rear body 16b of the magnetic pole is connected at an angle in the range of from 90 to 120 degrees to the front body 16a of the magnetic pole which corresponds to a convex projection. In other words, they form a generally convex projection on the substrate 11. Then, the front body 16a of the magnetic pole and the rear body 16b of the magnetic pole are overlaid with a protective layer made of $Al_2O_3$ and omitted from illustration to complete the formation of the essential part of an electromagnetic transducer of the thin-film magnetic head.

An insulating layer 23 made of $SiO_2$ and intended to define the position of formation of the magnetic pole proper 14a is disposed around the magnetic pole proper 14a. A coil drawer line 24 made of the same material as the magnetic material is provided behind the back of the rear auxiliary body 14b of the magnetic pole.

Figure 16:
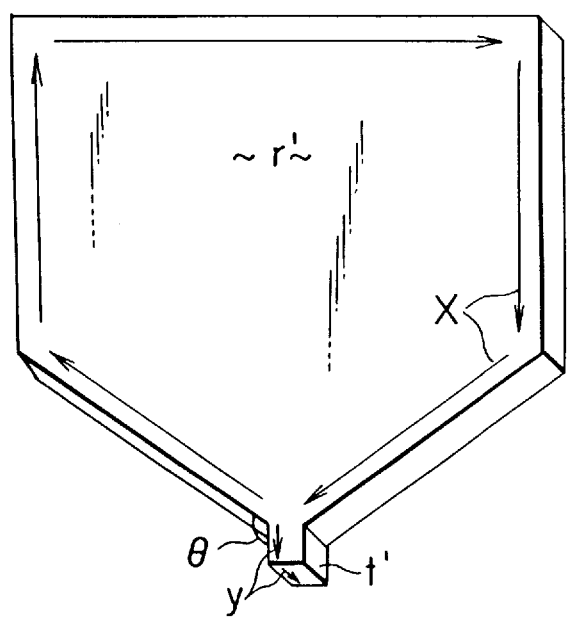
FIG. 16 is a diagram to aid in the explanation of the axis of easy magnetization of the front part of a magnetic pole in the conventional thin-film magnetic head.
Figure 17:
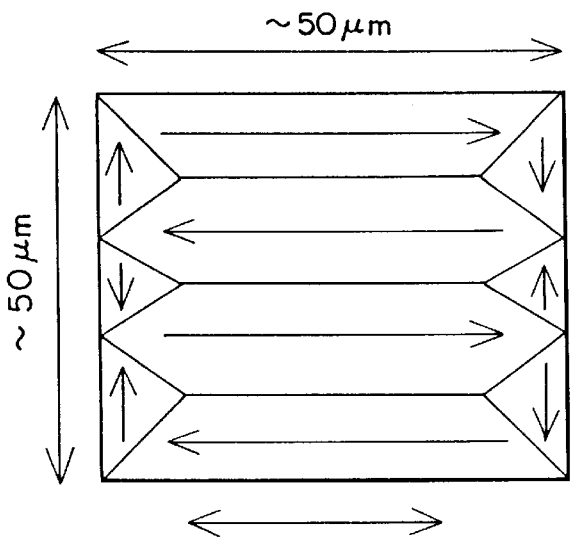
FIG. 17 is a diagram to aid in the explanation of the direction of magnetization of the rear body of a magnetic pole.
Figure 20:
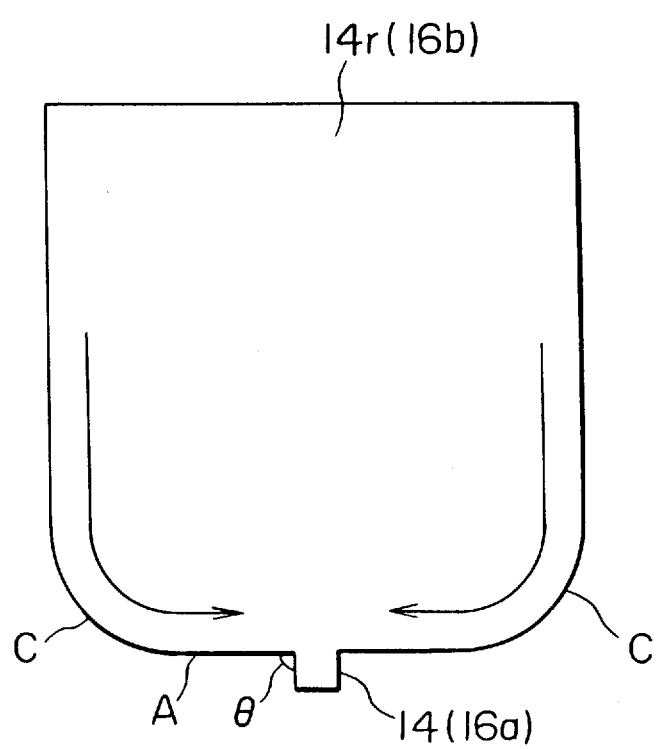
FIG. 20 is a diagram illustrating another example of the shape of a magnetic core in the thin-film magnetic head of Embodiment 5 of this invention illustrated in FIG. 14.

The angle θ of connection between the magnetic pole proper 14a in the lower magnetic core 14 and the front part of the magnetic pole in the upper magnetic core 16 and a rear part of the magnetic pole is restricted to within the range of from 90 to 120 degrees so that the axis of easy magnetization of the front part of the magnetic pole will be stably parallelized with the direction of track width even when the track is formed in a decreased width. If the angle θ of connection exceeds 120 degrees, the axis of easy magnetization will tend to be oriented in a direction perpendicular to the direction of track width as shown in FIG. 16. This appears particularly when the track width is decreased below 3 $\mu$m. Preferably, the angle θ of connection mentioned above is restricted to within the range of from 90 to 100 degrees. For the sake of converging the magnetic fluxes of the rear part of the magnetic pole in the front part of the magnetic pole, however, the magnitude of the angle θ of connection is desired to be increased to a certain extent. Thus, it is desirable to set the angle θ of connection with due respect to the impartation of the axis of easy magnetization mentioned above and the convergence of the magnetic fluxes. For the sake of the convergence of the magnetic fluxes, the opposite end parts C and C of the rear part of the magnetic pole which is connected to the front part of the magnetic pole are desired to be curved as shown in FIG. 20, for example. By this measure, the angle θ of connection can be approximated to 90 degrees and, at the same time, the convergence of magnetic fluxes can be promoted.

Now, the process by which the thin-film magnetic head constructed as described above is manufactured will be explained below with reference to FIGS. 21A, B, and C and FIGS. 22A, B, C, and D.

Figure 21A:
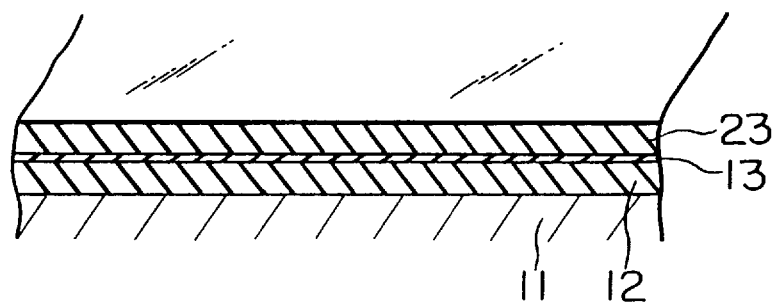
FIG. 21A, FIG. 21B and FIG. 21C are a series of cross sections to aid in the explanation of a process for the production of the essential part of the thin-film magnetic head of Embodiment 5 of this invention.
Figure 21B:
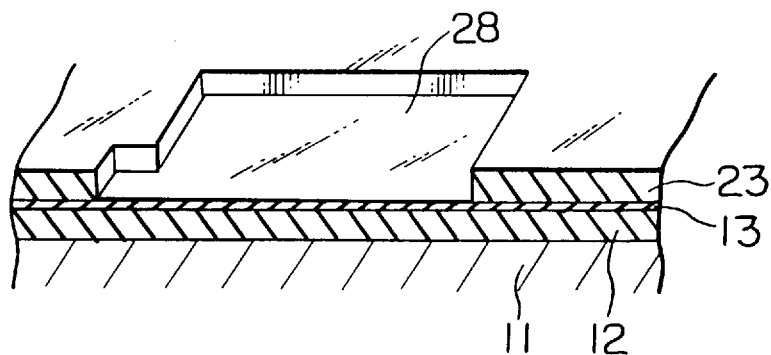
Figure 21C:
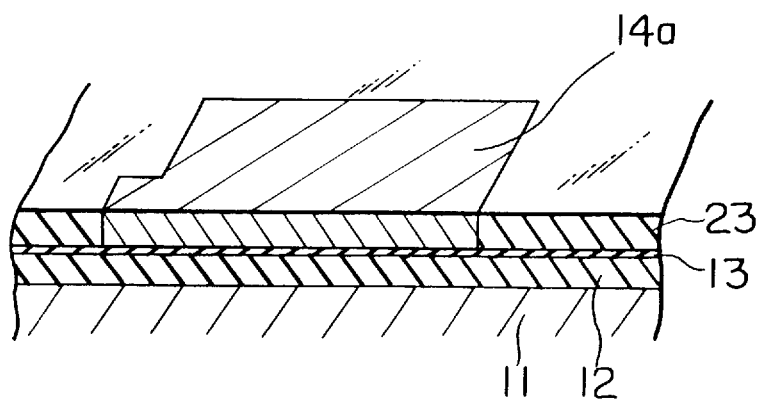

First, the insulating layer 12 having a thickness of about 5 $\mu$m and made of $Al_2O_3$, the etching stopper layer 13 having a thickness of about 0.1 $\mu$m, and the insulating layer 23 having a thickness of about 3.5 $\mu$m and made of $SiO_2$ are sequentially superposed on the substrate 11 as shown in FIG. 21A. The insulating layer 23 is to be formed in such a thickness as to include stock for cutting which is necessary in the subsequent polishing process. It is optional with the manufacturer to form the insulating layer 23 in the stated thickness in advance and then overlay an extra $SiO_2$ layer fated to serve as the stock for cutting on the insulating layer 23 through the medium such as of a polishing stopper layer and an etching mask.

Figure 18:
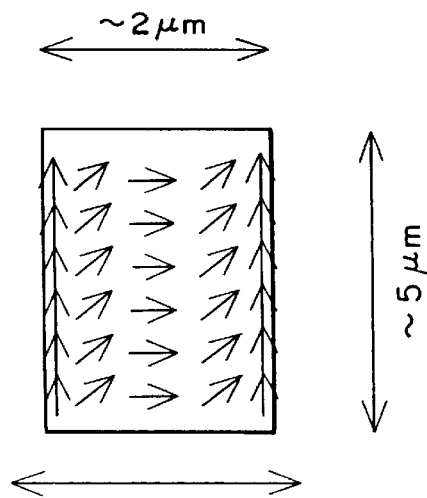
FIG. 18 is a diagram to aid in the explanation of the direction of magnetization of the front body of a magnetic pole.
Figure 19:
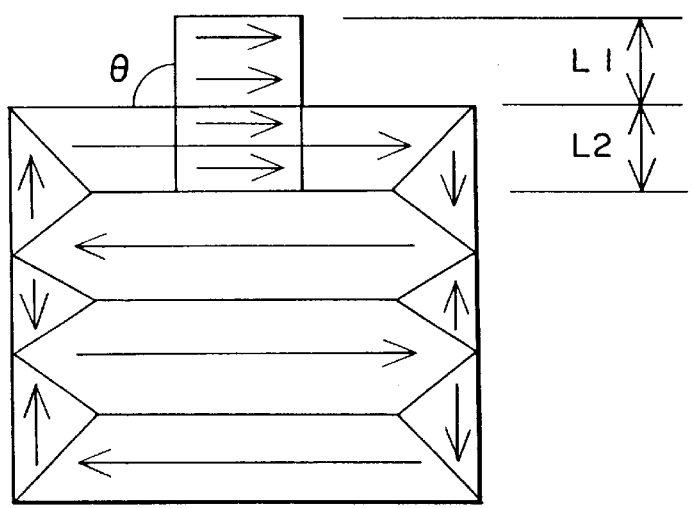
FIG. 19 is a diagram to aid in the explanation of the axis of easy magnetization of a front part of a magnetic pole of a magnetic core in the thin-film magnetic head of the present invention.

Then, the insulating layer 23 which is flat and smooth is overlaid with a resist mask (not shown) and etched with such an etching gas as $CF_4$ to form a trench 28 of an approximately convex shape corresponding to the part for forming the lower magnetic pole proper 14a as shown in FIG. 18B.

Now, a magnetic material destined to form the magnetic pole proper 14a is deposited inside the trench 28 by means of the collimation sputter with a collimator of the shape of an orifice and the extraneous remnant, if any, from the sputtering is removed as by polishing to complete the formation of the lower magnetic pole proper 14a which is composed of the convex shaped front part of the magnetic pole and the rear part of the magnetic pole.

Figure 23:
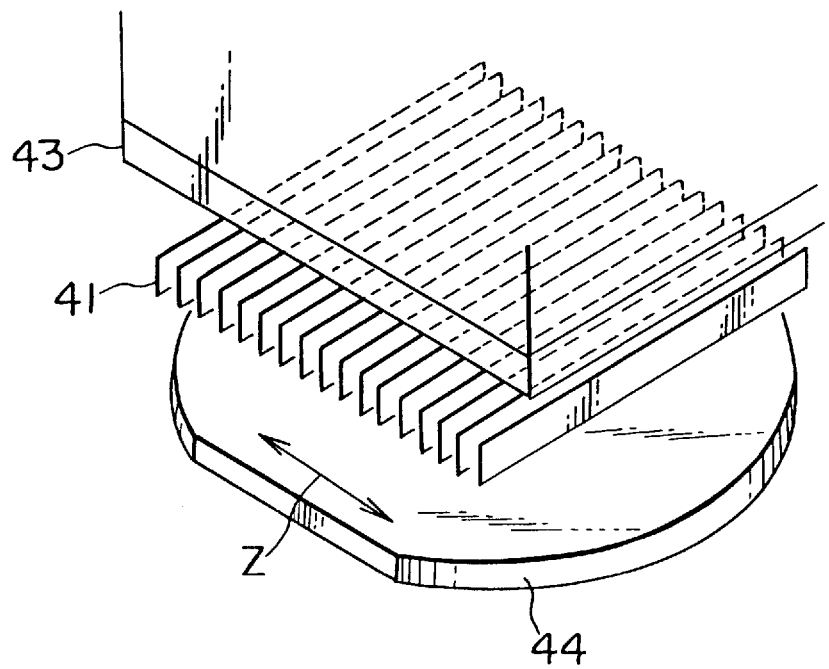
FIG. 23 is a diagram to aid in the explanation of collimation sputter to be used in the process for the production of the thin-film magnetic head of this invention.
Figure 24:
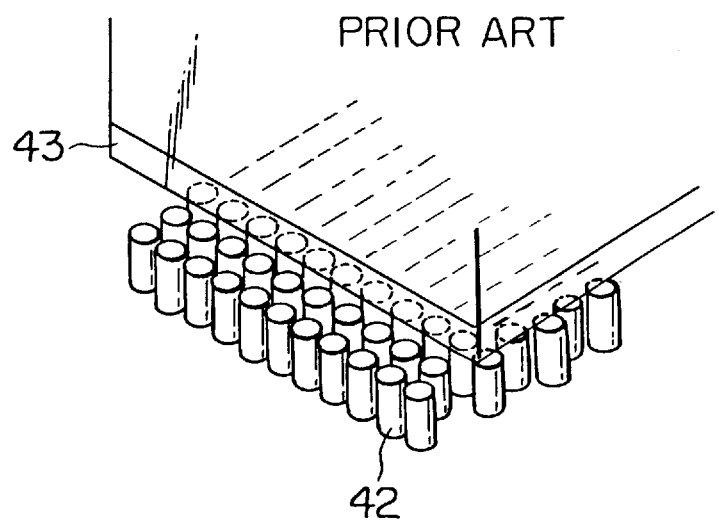
FIG. 24 is a diagram to aid in the explanation of ordinary collimation sputtering.

Here, the collimation sputter of the magnetic material for the formation of the magnetic pole proper 14a is desired to carry out by the use of an orificial collimator 41 as shown in FIG. 23. This orificial collimator 41 serves the purpose of repressing flight of sputter particles in the direction of width thereof. The use of this orificial collimator 41 permits the rate of sputtering to be increased to at least three times the rate which is obtained when such an ordinary collimator 42 as shown in FIG. 24, for example, is used. In the diagram, 43 stands for a sputter target and 44 for a substrate to be overlaid.

The orificial collimator 41 described above is desired to be so disposed that the longitudinal direction thereof will fall substantially perpendicularly to the direction of track width of the magnetic core (indicated by the arrow Z in the diagram). Then, the minute portion of the trench 28 which corresponds to the part for the formation of the front part of the magnetic pole can be ideally filled with the sputter particles without entrapping a void therein because the direction in which the front part of the magnetic pole is projected coincides with the direction of flight of the sputter particles. This embedment of the magnetic material in the front part of the magnetic pole is affected also by the shape of the magnetic pole proper 14a. If the rear part of the magnetic pole is connected at an angle exceeding 120 degrees, a magnitude fit for a fan, relative to the front part of the magnetic pole as shown in FIG. 16, voids (cavities) tend to occur specifically in the basal portion of the front part of the magnetic pole in spite of the use of the orificial collimator 41 described above because the sputter particles are suffered to disperse in the directions perpendicular to the sides of the fan. The occurrence of voids particularly in the front part of the magnetic pole can be precluded by constructing the magnetic pole proper 14a so that the rear part of the magnetic pole may be connected at an angle in the range of from 90 to 120 degrees to the part of the magnetic pole. The ease with which such voids as are entrapped in the magnetic core of the conventional shape tend to occur mounts in accordance as the angle formed between the longitudinal direction of the orificial collimator 41 and the direction of track width deviates from the approximate right angle. Thus, the orificial collimator 41 is desired to be so disposed that the longitudinal direction thereof will fall substantially perpendicularly to the direction of track width.

Figure 22A:
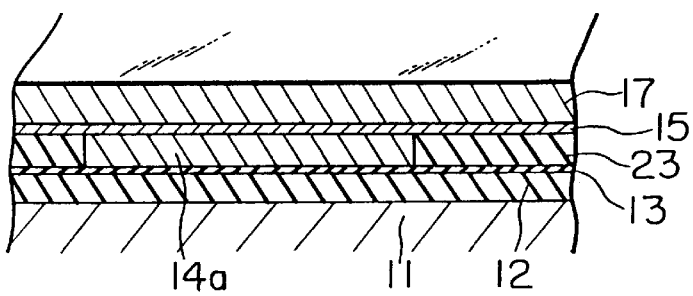
FIG. 22A, FIG. 22B, FIG. 22C and FIG. 22D are a series of cross sections to aid in the explanation of a process for the production of the essential part of the thin-film magnetic head of Embodiment 5 of this invention following the process of FIG. 18.
Figure 22B:
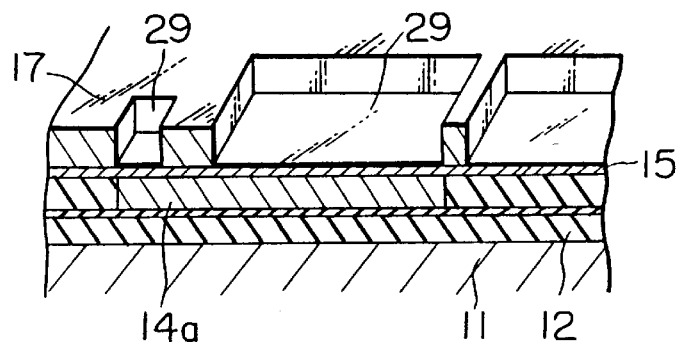

Then, the magnetic gap 15 having a thickness of about 0.1 µm and the insulating layer 17 having a thickness of about 3.5 µm are sequentially superposed on the magnetic pole proper 14a as shown in FIG. 22A. Incidentally, this insulating layer 17 is to be formed in a thickness including stock for cutting which is required at the subsequent polishing process. It is optional with the manufacturer to overlay the insulating layer 17 with a polishing stopper layer, an etching mask, and a $SiO_2$ layer fated to serve as the stock for cutting similarly to the process shown in FIG. 21A. Then, the insulating layer 17 is overlaid with a resist mask and then etched similarly to the process described above. In consequence of this etching, a trench 29a for embedding the front body 16a of the magnetic pole and a trench 29b for embedding the rear auxiliary body 14b of the lower magnetic pole will be obtained as shown in FIG. 22B.

Here, the magnetic gap 15 is intended to serve concurrently as an etching stopper layer during the course of the etching operation mentioned above. It is, therefore, desired to be formed of such a material as $Al_2O_3$, for example, which is etched slowly with a fluorine type reactive gas and is allowed to fulfill the function of a magnetic gap. The fact that the magnetic gap 15 concurrently discharges the part of an etching stopper layer as described above contributes to promote the exaltation of the yield because the gap is enabled to retain its size intact even when the etching performed for the formation of the trench in the front body 16a of the magnetic pole is carried out more or less excessively.

Figure 22C:
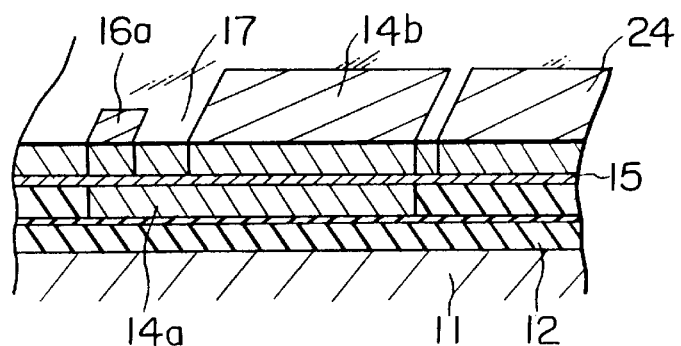
Figure 22D:
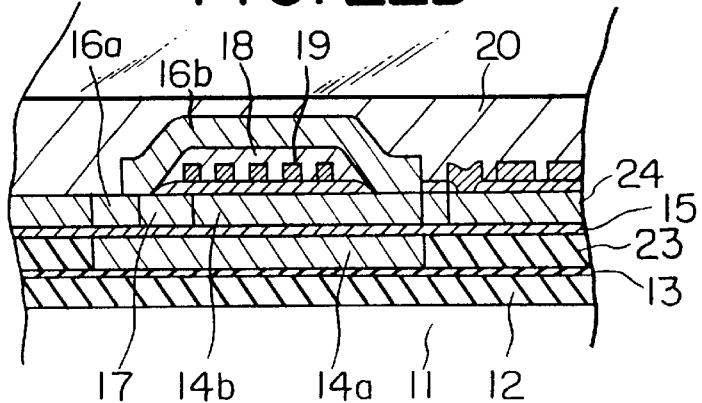

Now, a magnetic material is deposited by means of the collimation sputter by the use of an orificial collimator inside the trenches 29a and 29b similarly to the embedding operation performed on the magnetic pole proper 14a as described above and then the extraneous remnant, if any, from the sputtering is removed as by polishing to form the front body 16a of the magnetic pole and the rear auxiliary body 14b of the magnetic pole both in the substantial shape of a rectangular solid as shown in FIG. 22C. In the present embodiment, the coil drawer line 24 is simultaneously formed in the course of the embedding operation.

The insulating layer 18 made of polyimide resin and having embedded therein the coil 19 made of Cu is superposed on the front body 16a of the magnetic pole and the rear auxiliary body 14b of the magnetic pole and then the magnetic member destined to serve the rear body 16b of the upper magnetic pole and a protective layer 20 made of $Al_2O_3$ are further superposed thereon, to complete the formation of the electromagnetic transducer of the thin-film magnetic head of the present invention. During the process described above, it is optional with the manufacturer to form the magnetic gap 15 by means of the collimation sputter before the magnetic materials destined to form the front body 16a of the magnetic pole and the rear auxiliary body 14b of the magnetic pole are formed by means of the collimation sputter.

Figures 25A, 25B, 25C:
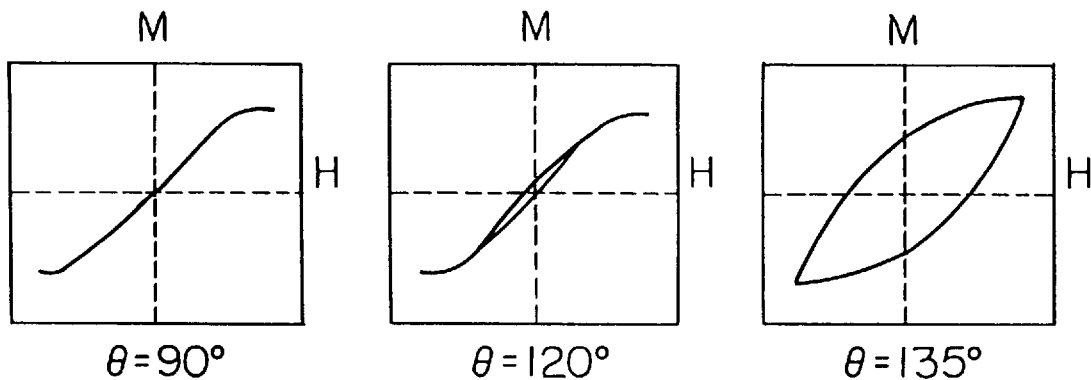
FIG. 25A, FIG. 25B and FIG. 25C are characteristic diagrams illustrating results of the determination of a MH loop in the front part of a magnetic pole of an lower magnetic core in the thin-film magnetic head of Embodiment 5 of the present invention.

In accordance with the construction of the thin-film magnetic head of the embodiment described above and the method for the manufacture thereof, the lower magnetic core 14 and the upper magnetic core 16 of a narrow track having the axis of easy magnetization of the front part of the magnetic pole parallelized with the direction of track width can be obtained stably and efficiently while satisfying the requirement as to the adaptability for mass production. FIG. 25 shows test results of the MH loop which the lower magnetic core 14 and the upper magnetic core 16 describe when the angle θ of contact between the front part of the magnetic pole and the rear part of the magnetic pole is varied. The test results shown in FIG. 25 are derived from an experiment using a track width fixed at 2 µm and applying a magnetic field in the direction of depth (the direction of excitation of the front part of the magnetic pole). FIG. 25A, B, C are characteristic diagrams showing the test results of the lower magnetic core 14. It is clearly noted from FIGS. 25 and B that the axis of easy magnetization of the front part of the magnetic pole fall parallelly with the direction of track width when the angle θ of connection is in the range of from 90 to 120 degrees. In contrast thereto, as shown in FIG. 25C, the axis of easy magnetization falls perpendicularly to the direction of track width when the angle θ of connection exceeds 120 degrees.

Figure 26:
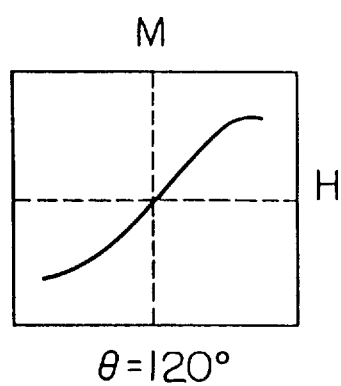
FIG. 26 is a characteristic diagram illustrating a result of the determination of a MH loop in the front part of a magnetic pole of an upper magnetic core in the thin-film magnetic head material of Embodiment 5 of the present invention.

FIG. 26 is a characteristic diagram showing the test results of the upper magnetic core 16. The MH loop of the upper magnetic core shows substantially similar results as those of the lower magnetic core when the angle θ of connection is 90 or 135 degrees. In contrast thereto, it is noted from 26 that a complete linearity thereof can be obtained with a distinct difference from the lower magnetic core. From these results, it was confirmed that the partial superposition of the front part of the magnetic pole with the rear part of the magnetic pole is effective to fall the axis of easy magnetization in the front part of the magnetic pole parallelly with the direction of track.

Further, in the lower magnetic core, the magnetic core composed of a laminate construction having a nonmagnetic layer of $Al_2O_3$ interposed between two magnetic layers made of CoZrNb, with the angle of connection set at 120 degrees shows the same results as that shown in FIG. 26. It was confirmed from FIG. 26 that the anisotropy of the axis of easy magnetization is further enhanced by forming the magnetic core with a laminated magnetic material.

Namely when the track width is decreased, the thickness of the magnetic layer can be decreased and the axis of easy magnetization can be easily parallelized with the direction of track width by using for the magnetic core the two-layer laminated magnetic material incorporating therein the nonmagnetic layer as of $Al_2O_3$ described above.

In the embodiment described above, the front part of the magnetic pole the which has the track width decreased to below 1 μm can be obtained with high accuracy and satisfactory repeatability and with a tolerance confined within ±0.1 μm because the magnetic pole proper 14a of the lower magnetic core 14 and the front body 16a of the magnetic pole of the upper magnetic core 16 are formed by in advance embedding a magnetic material by means of the collimation sputter within the trenches 28 and 29a formed as with the insulating layers 23 and 17. Particularly as respects the front body 16a of the upper magnetic pole of the magnetic core 16, the accuracy of positioning thereof can be markedly improved because the trench 29a destined to serve as the site for formation of the front body 16a of the magnetic pole is shaped in a state devoid of difference of level. Since the front body 16a of the magnetic pole is formed by embedding the magnetic material by means of the collimation sputter within this trench 29a, the front body 16a of the magnetic pole can be obtained with high quality without entrapping voids therein in a highly accurately positioned state.

Further, the magnetic pole proper 14a and the front body 16a of the magnetic pole can be heat-treated at elevated temperatures up to about 500° C. because they are wholly formed of an inorganic material excelling in resistance to heat and further because they are completely formed prior to the formation of the insulating layer 18 in which the coil 19 is to be embedded. As a result, the magnetic member having a high saturation flux density can be vested with uniaxial anisotropy which is prone only to insignificant dispersion.

In the upper magnetic core 16 of the thin-film magnetic head of the embodiment described above, it is optional with the manufacturer to have the front body 16a of the magnetic pole and the rear body 16b of the magnetic pole formed with mutually different magnetic materials. By using a material having a higher saturation flux density or a material having a larger anisotropy of induced magnetism for the front body 16a of the magnetic pole, for example, the recording on a magnetic recording medium of high coercive force can be facilitated and the thickness of the magnetic layer in the front part can be decreased. As a result, the desire to diminish the amount of side fringing can be satisfied. Further by setting the anisotropic magnetic field $H_K$ of the front body 16a of the magnetic pole at a high level and, at the same time, setting the anisotropic magnetic field $H_K$ of the rear body 16b of the magnetic pole at a low level, magnetic resistance offered by the magnetic path can be decreased and the head efficiency can be exalted.

The embodiment described above represents a case of embedding the magnetic material by means of sputter in the trench formed in advance by RIE. It is optional with the manufacturer to form a film of the magnetic material, shape the film of the magnetic material as by ion milling or RIE, and then form the insulating layer and perform the work of polishing back thereon as usually practiced. In this case, however, the accuracy of track width is more or less degraded.

Embodiment 6

The thin-film magnetic head according to this embodiment is a thin-film magnetic head which is provided with such an embedded magnetic pole as shown in FIG. 1 and is characterized in that a trench in which a magnetic pole is embedded has lateral walls having a taper of at least two steps. First, this thin-film magnetic head will be described below with reference to one example of the process of production shown in FIGS. 24A, B, and C.

Figure 27A:
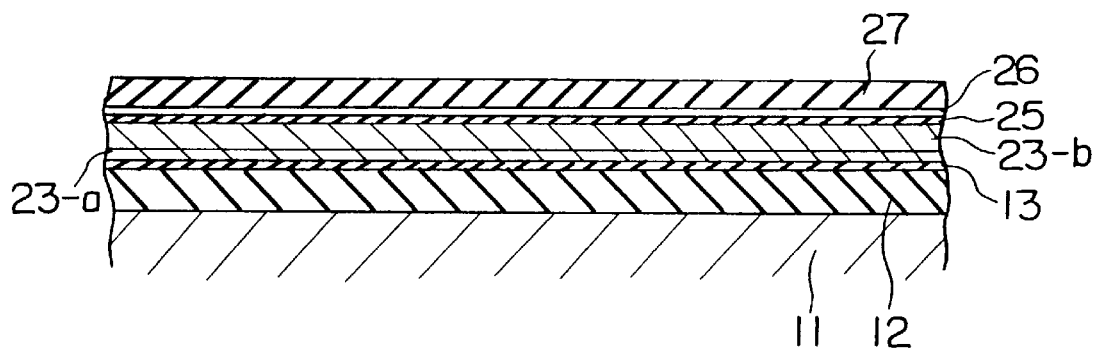
FIG. 27A, FIG. 27B and FIG. 27C are a series of longitudinal cross sections to aid in the explanation of a process for the production of the essential part of a thin-film magnetic head obtained in Embodiment 6 of the present invention.

First, as shown in FIG. 27A, the insulating film 12 made of $Al_2O_3$, the etching stopper 13 made of $Al_2O_3$ or C, an insulating layer 23a made of $SiO_2$, an insulating layer 23b made of a sputtered $SiO_2$ film, a polishing stopper layer 25 made of $Al_2O_3$, an etching mask 26 made of C or Si, and an insulating layer 27 made of $SiO_2$ are superposed on the substrate 11. In this case, the insulating layer 27 is destined to serve as stock for cutting in the subsequent polishing operation.

Figure 27B:
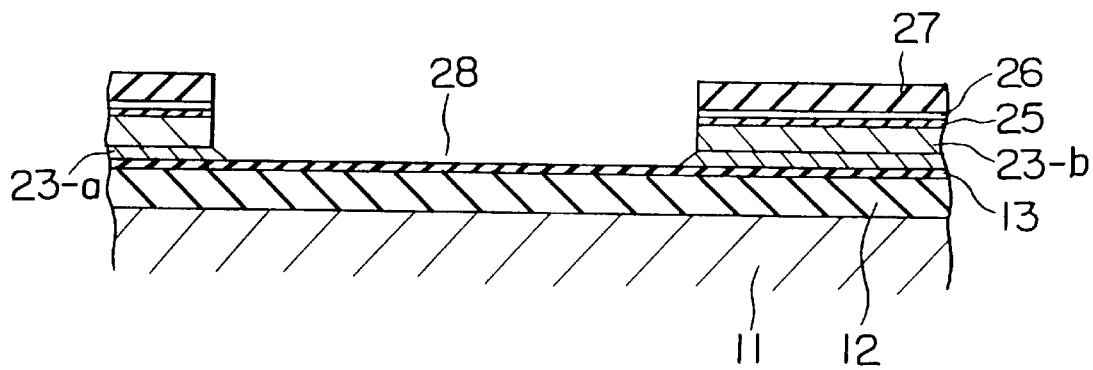

Then, as shown in FIG. 27B, after the formation of a resist mask (not shown), the insulating layer 27 is etched with such a gas as $CF_4$, then the etching mask 26 with such a gas as $O_2$, subsequently the polishing stopper layer 25 with such a gas as Ar-containing $CF_4$, and finally the insulating layer 23a, 23b with such a gas as $CF_4$ invariably by means of RIE, for example. Thus, the resist mask is removed and the trench is completed. At this time, owing to the presence of the etching mask 26, the upper parts of the lateral walls defining the trench can be cut vertically. By controlling such etching conditions as the temperature of the substrate, the lateral walls can be converged or diverged to a certain degree in the direction of depth of the trench. Further, owing to the presence of the etching stopper 13, the relevant films can be excessively etched to suit the occasion. Further, by properly selecting the gases to be used for etching the insulating layer 23a and the insulating layer 23b both in terms of kind and quantity so that the former layer 23a may be etched at a lower speed than the latter layer 23b, the tapering angle of the trench near the bottom parts of the lateral walls of the trench can be decreased from the tapering angle of the trench at the other parts of the lateral walls to impart the lateral walls having a taper of substantially two steps to the trench.

Figure 27C:
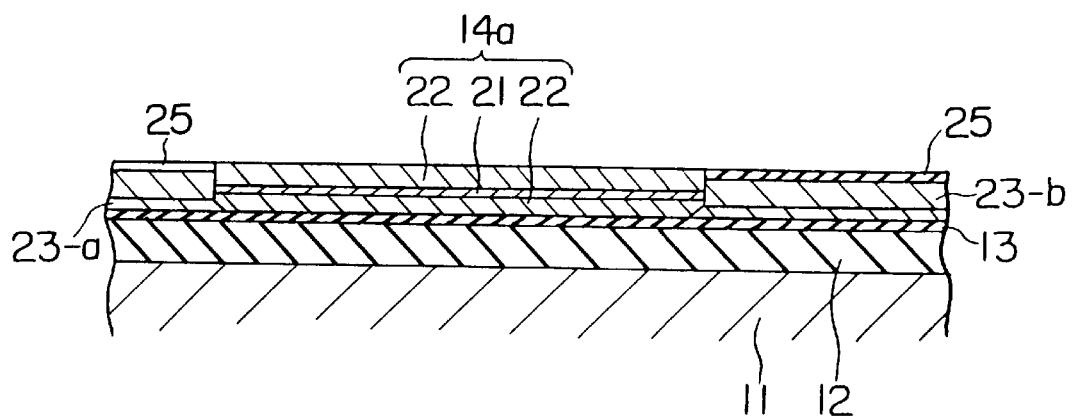

Then, as shown in FIG. 27C, the laminated magnetic layer having two layered structure is deposited as by means of the collimation sputter and then the extraneous remnant, if any, from the sputtering is removed by polishing to complete the magnetic pole proper 14a of the lower magnetic core 14 in the embedded state. In this case, the magnetic properties of the edge part of the embedded magnetic film are easily controlled when a proper radius of curvature was left in the bottom edges of the trench in the preceding step.

Figure 28:
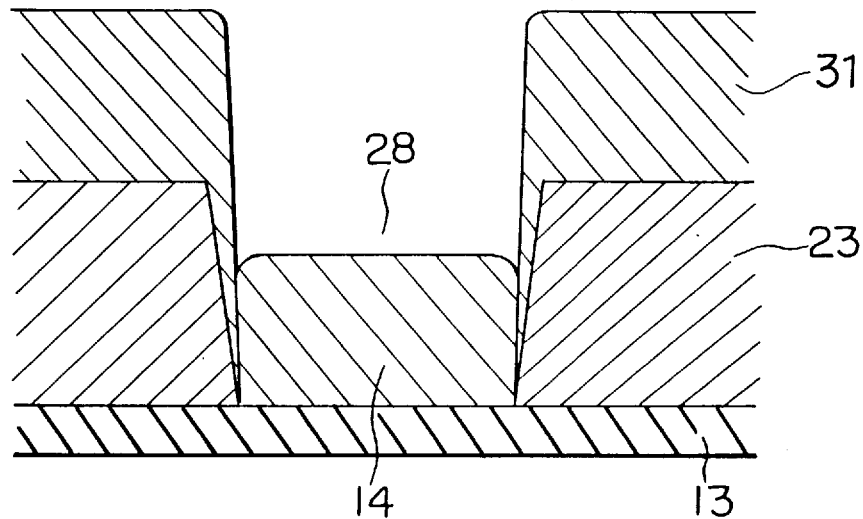
FIG. 28 is an explanatory diagram illustrating with a model the manner in which a trench formed with lateral walls of an ordinary one-step taper is filled with a magnetic material.
Figure 29:
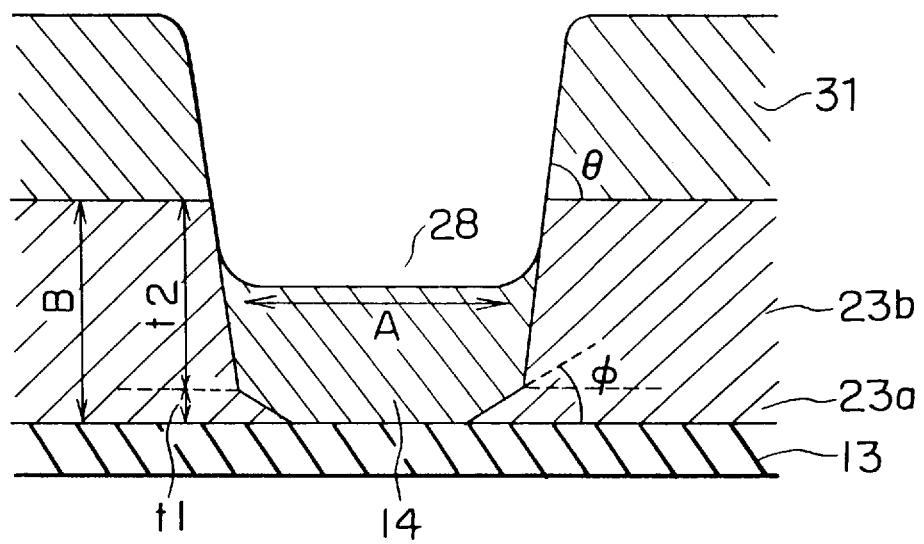
FIG. 29 is an explanatory diagram illustrating with a model the manner in which a trench formed with lateral walls containing a two-step taper is filled with a magnetic material as described in Embodiment 6 of the present invention.

Here, FIGS. 28 and 29 illustrate with a model the manner in which a trench is embedded with a magnetic material in the above embodiment. FIG. 28 illustrates the manner in which the trench having an ordinary one step taper, and FIG. 29 illustrates the manner in which the trench having substantially two steps taper.

As illustrated in the figures, by embedding the magnetic material in the trench having the lateral walls having two-step taper, the gross porosity which would otherwise occur during the collimation sputtering can be thoroughly precluded in the resent embodiment.

Then, after the formation of the magnetic gap on the magnetic pole proper 14a, the insulating layer, the polishing stopper layer, and the insulating layer as stock for cutting are formed in the same manner as in the process of the above embodiment except forming the trench having lateral walls of two-step taper and the resist mask is formed.

Then, the insulating layer, the polishing stopper layer, and the insulating layer mentioned above are etched in order and the resist mask is removed to complete the trench.

Further, the laminated magnetic layer having two-layer structure is deposited in the trench as by means of the collimation sputter and the extraneous remnant, if any, from the sputtering is removed by polishing to complete the embedment of the front body 16a of the magnetic pole of the upper magnetic core 16 and the rear auxiliary body of the magnetic pole of the lower magnetic core.

Further, the insulating layer having the coil embedded therein, the rear auxiliary body of the magnetic pole of lower magnetic core, and the protective layer are formed to complete the formation of the electromagnetic transducer of the magnetic head of the present invention.

In accordance with the construction and the method of production described above, the otherwise possible occurrence of gross porosity during the embedment of the magnetic material as by collimation sputter can be perfectly precluded by forming the trench having the lateral walls of substantially two-step taper, namely in a smaller angle near the bottom parts of the lateral walls defining the trench than at the other parts of the lateral walls.

Further, as respects the dimensions of the two-step taper, let A stand for the width of the trench, B for the depth thereof, t1 for the thickness of the insulating layer of the lower layer, t2 for the thickness of the insulating layer of the upper layer, $\phi$ for the angle of taper in the lower layer, and $\theta$ for the angle of taper in the upper layer as shown in FIG. 29, and the effect of the impartation of the two-step taper will be recognized when the conditions of $0°<\phi<88°$ and $\phi<\theta$ are satisfied without reference to the other dimensions. The impartation of the two-step taper or the impartation of bottom corners of a radius of curvature is easily attained when the condition of $t1>0.01 \times t2$ is satisfied. Further, more effect is also recognized to exist under the condition, $t1>\alpha^2 \times 0.01 \times t2$, wherein $\alpha$ stands for B/A.

Figure 30:
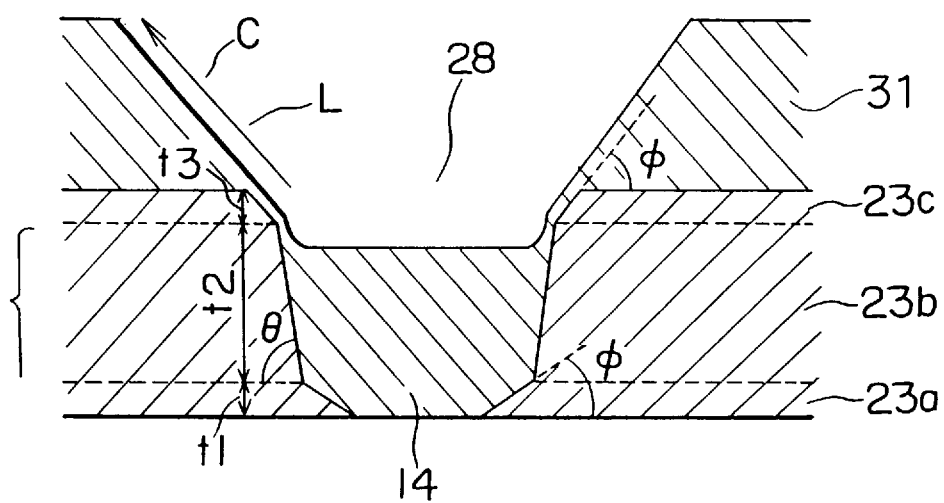
FIG. 30 is an explanatory diagram illustrating with a model the manner in which a trench formed with lateral walls containing a three-step taper is filled with a magnetic material as described in Embodiment 6 of the present invention.

More further, FIG. 30 is a model diagram depicting the result of embedding the magnetic film by collimation sputter in a trench of three-step taper as an applied embodiment of this invention. In this case, owing to the presence of the taper angle $\psi$ of the third step, the length L of the converging walls in the C part of the film can be increased with the progress of the formation of the film by merely applying a substrate bias of about $0.1$ W/cm$^2$ during the formation of the film. In consequence of this increase of the length L, the prevention of the occurrence of the gross porosity is further facilitated because the speed of film formation on the bottom surface of the trench can be maintained in spite of the progress of the film formation.

Further, the damage inflicted on the film by ion bombardment can be decreased because the substrate bias necessary for the prevention of the occurrence of gross porosity can be reduced. This effect is particularly conspicuous during the embedment of an amorphous film which is susceptible of crystallization. The amorphous state of the magnetic film for embedment can be kept intact because the occurrence of the gross porosity is prevented with a low substrate bias. When the ratio in atomic percentage of Co: Zr:Nb in the alloy of CoZrNb is 88:5:8 and the film-forming speed is about 200 A/min., the film undergoes partial crystallization and has the antimagnetic force thereof raised approximately to 0.5 oersted at a substrate bias of about $0.2$ W/cm$^2$. By imparting a three-step taper to the trench, the film is enabled by a substrate bias of not more than about $0.1$ W/cm$^2$ to acquire an effect equivalent to what is otherwise obtained with a substrate bias of not less than $0.2$ W/cm$^2$ and the film can be completely prevented from crystallization. As respects the thickness t3 of the added layer, the effect of this layer is discernible when this thickness is at least $0.05$ $\mu$m.

The formation of this trench of three-step taper can be implemented by first carrying out chemical dry etching (CDE) in the initial stage of the trench etching operation and then performing RIE in the same manner as in the method described above. And the impartation of the taper angle $\psi$ of the third step can be rendered easy by using a material such as $Si_3N_4$ as the raw material for the insulating layer to which the third step of taper is to be formed.

Embodiment 7

This embodiment concerns a thin-film magnetic head in which the front body of a magnetic pole of an upper magnetic core is manufactured by a procedure comprising the steps of embedding a magnetic material as by the collimation sputter in a trench formed as of $SiO_2$ and then removing the extraneous remnant, if any, from the sputtering by polishing or etching back. The trench mentioned above is tapered with a smaller angle near the upper parts of the lateral walls defining the trench than the remaining parts of the lateral walls excluding the parts near the upper edges parts of the lateral walls.

Namely, in this embodiment, both front parts of the magnetic pole of an upper magnetic core and a lower magnetic core are formed by embedding in a trench having lateral walls of two-step taper, a taper angle near the bottom parts of the lateral walls of the trench in the lower magnetic core is provided to be smaller than that of the other parts of the lateral walls excluding the parts near the bottom parts, and a taper angle near the upper edge parts of the lateral walls of the trench in the upper magnetic core is smaller than that of the other parts of the lateral walls excluding the parts near the upper edge parts.

The method for the production of the thin-film magnetic head of the present embodiment will be explained below with reference to FIGS. 31A, B, C, D, and E.

First, an insulating layer 12 made of $Al_2O_3$ and an insulating layer 23 made of $SiO_2$ sputter are superposed on a substrate 11. After the subsequent formation of a resist mask (not shown), an insulating layer 23 mentioned above is etched with such a gas as $CF_4$. The trench mentioned above is further etched, with the substrate temperature kept at such a low level as about 273K, and consequently tapered with a smaller angle near the bottom parts of the lateral walls defining the trench than at other parts of the lateral walls.

Figure 31A:
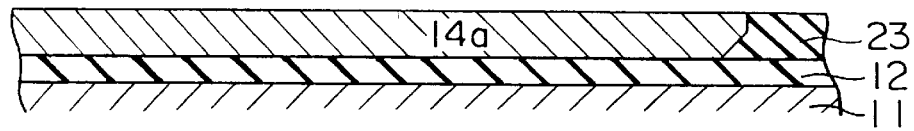
FIG. 31A, FIG. 31B, FIG. 31C, FIG. 31D and FIG. 31E are a series of longitudinal cross sections to aid in the explanation of a process for the production of the essential part of a thin-film magnetic head obtained in Embodiment 7 of the present invention.

Then, after a magnetic film is deposited in the trench by the collimation sputter, an extraneous remanent is removed by polishing, and the magnetic pole proper 14a of the lower magnetic core 14 is formed by embedding, as shown in FIG. 31A At this time, the possible occurrence of a gross porosity during the collimation sputter is also recognized as the embodiment 6. Thus, the embedment of the magnetic material in the trench having the lateral walls of two-step taper shows a good result, as shown in FIG. 29.

Figure 31B:
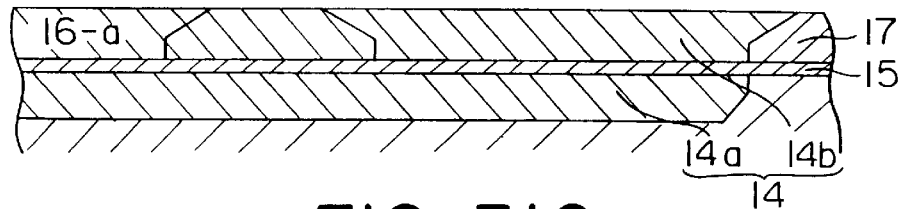
Figure 31C:
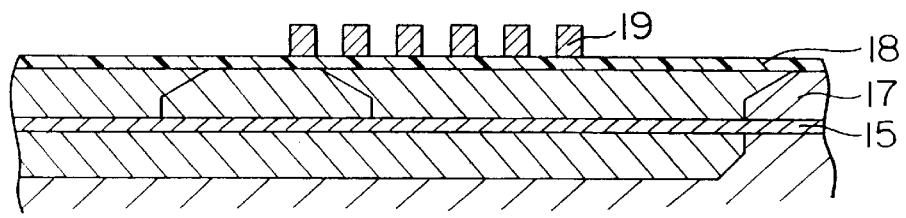
Figure 31D:
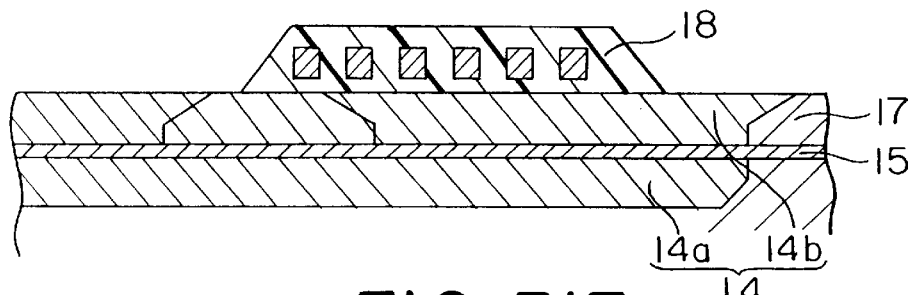
Figure 31E:
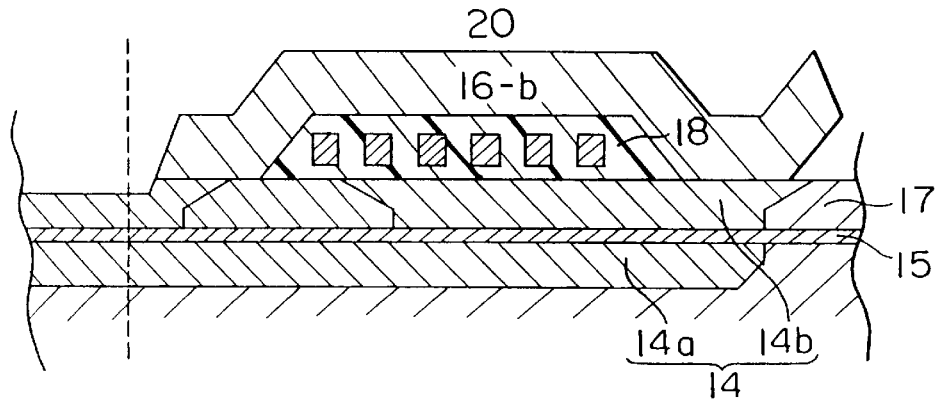

Thereafter, as shown in FIG. 31B, a magnetic gap 15 and an insulating layer 17 are formed, a resist mask (not shown) is formed, and the insulating layer 17 mentioned above is etched to form a trench. In this case, the first part of the etching operation is carried out in the CDE with such a gas as $CF_4$ and the remaining part thereof is carried out by RIE in the perpendicular direction. Further, the magnetic material is deposited in the trench by the collimation sputter and the extraneous remnant, if any, from the sputtering is removed by polishing to complete a front body 16a of the magnetic pole of the upper magnetic core and a rear auxiliary body 14b of the magnetic pole of the lower magnetic core in the embedded state.

Further, as shown in FIG. 31B, in which an insulating layer 18 is formed, a coil 19 is embedded, and a rear body 16b of a magnetic pole of an upper magnetic core 16 and a protective layer 20 are formed to complete the formation of an electromagnetic transducer of the magnetic head of this invention.

Figure 32A:
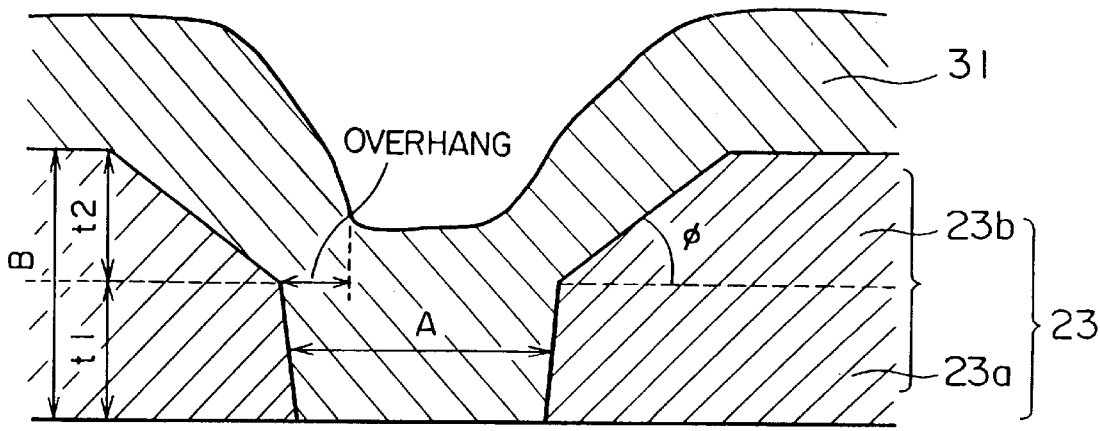
FIG. 32A and FIG. 32B are a series of explanatory diagrams illustrating with a model the manner in which a trench formed with lateral walls containing a two-step taper is filled with a magnetic material as described in Embodiment 7 of the present invention.

As respects the dimensions of the two-step taper, let A stand for the width of the trench, B for the depth thereof, t1 for the thickness of the insulating layer 23a of the lower layer, t2 for the thickness of the insulating layer 23b of the upper layer, and φ for the angle of taper in the lower layer as shown in FIG. 32A, and the effect of the impartation of the two-step taper produced in precluding the occurrence of a gross porosity will become conspicuous when the t1/A is less than 2 without reference to the other dimensions. The effect is also obtained under the condition of $0°<\phi<45°$.

Figure 32B:
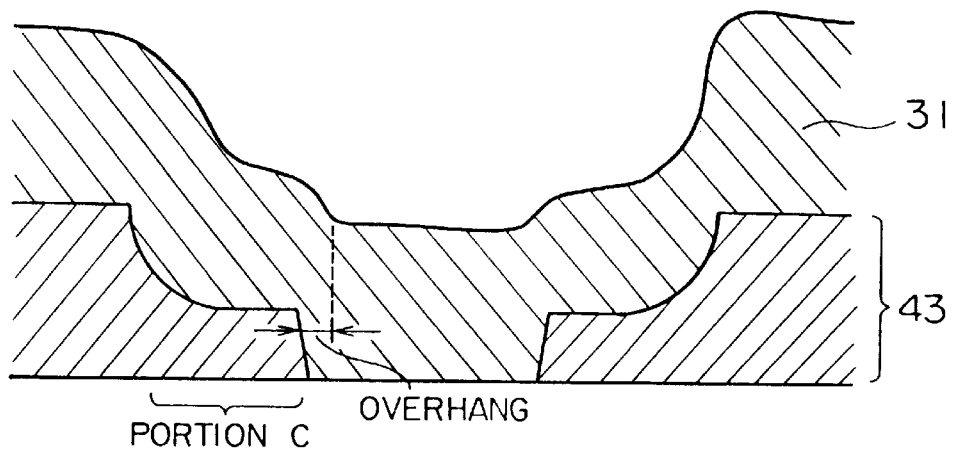

Further, FIG. 32B represents a trench of two-step taper as another applied embodiment of this invention. It is clearly noted from the diagram that an overhang from the part C is repressed and the condition of embedment is further improved.

Figure 33:
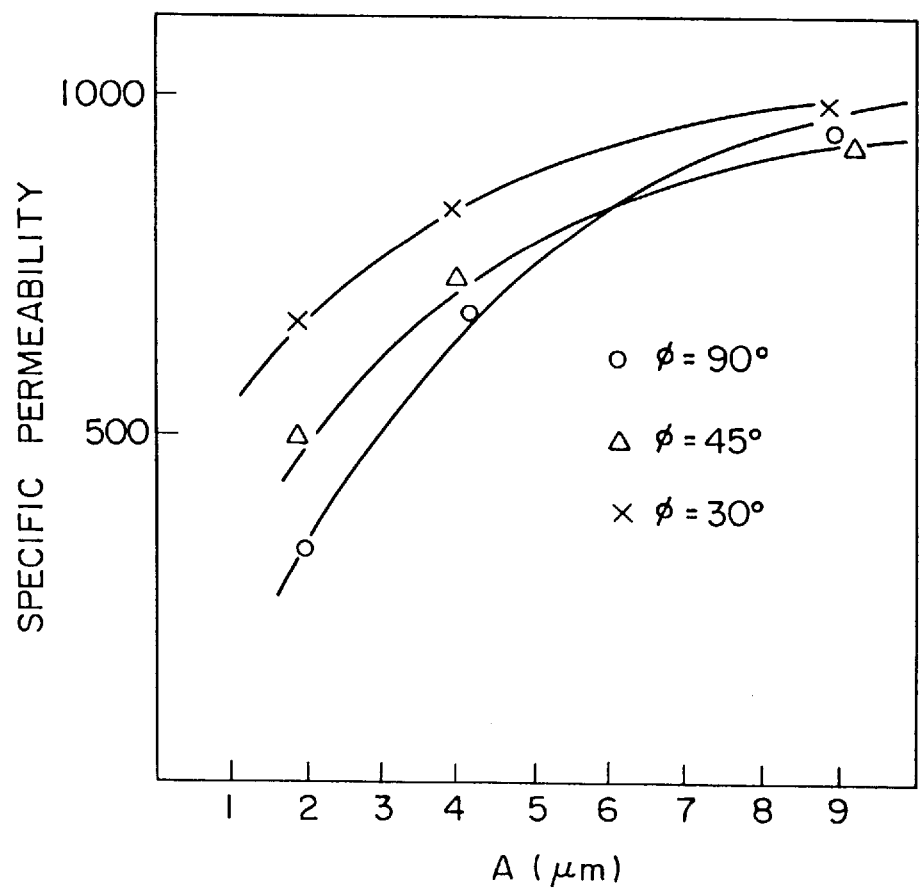
FIG. 33 is a graph showing the taper angle dependency of the specific permeability of a stripe as described in Embodiment 7 of the present invention.

FIG. 33 shows the dependency of the relative magnetic permeability of the magnetic layer having a stripe-shape which is embedded in the trench of two-step taper as shown in FIG. 32A and has a thickness B of 2 μm, a length of 8.5 mm on φ a width of A μm. As shown in this FIG. 33, the relative magnetic permeability decreases as the width decreases, but the relative magnetic permeability in case of smaller width i.e. narrower track width significantly increases as the angle of taper decreases.

Figure 34:
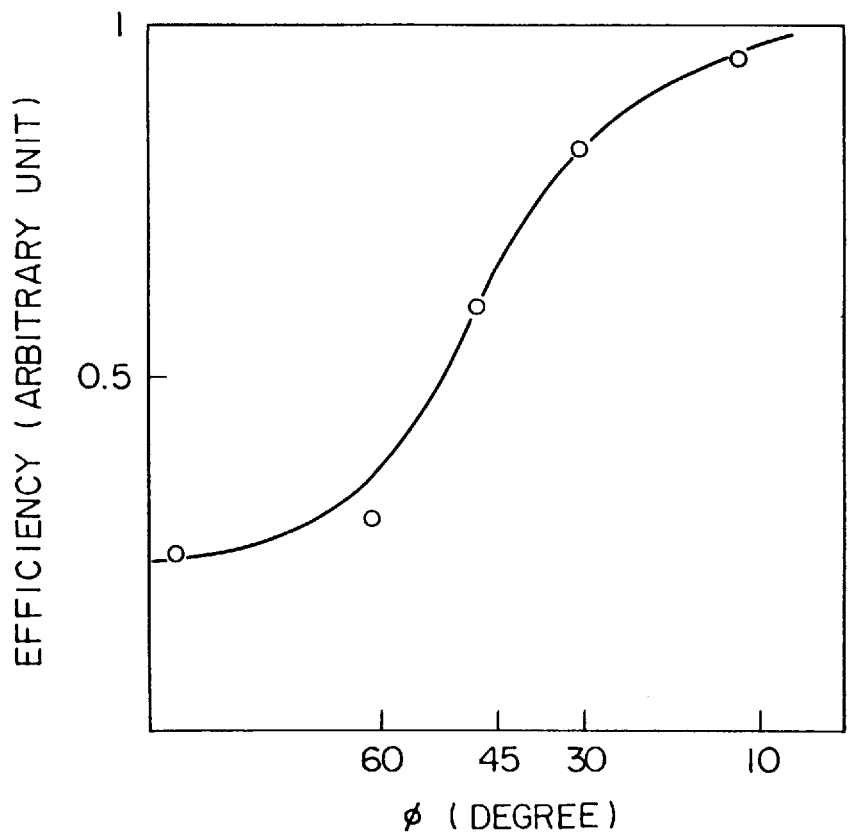
FIG. 34 is a graph showing the taper angle dependency of the head efficiency as described in Embodiment 7 of the present invention.

Further, FIG. 34 shows the recording efficiency in such thin film magnetic head when the angle of taper is varied. As clearly shown in this FIG. 34, the recording efficiency increases as the angle of taper decreases. At this time, the front body of the magnetic pole of the upper magnetic core has a depth of 3 μm and a track width of 2 μm.

The embodiments thus far described represent cases of using independently the thin-film magnetic head of this invention. For example, the thin-film magnetic head of this invention may be used as an exclusively recording head and a regenerating head as of a MR element (such as, for example, a laminate) may be formed separately thereof.

As described above, this invention is capable of producing a thin-film magnetic head which enables the axis of easy magnetization of the leading end part of a magnetic pole to be stably oriented in the direction of track width and also permits incorporation therein of a narrow track simultaneously fulfilling both dimensional tolerance and adaptability for mass production. Thus, thin-film magnetic heads of narrow tracks which have high quality enough to operate with a high recording density up to 10 $Gb/inch^2$, for example, can be produced with high repeatability and high efficiency.

What is claimed is:

1. A thin-film magnetic head comprising:
   a lower magnetic core;
   an upper magnetic core formed above the lower magnetic core with a magnetic gap therebetween, at least one of the lower magnetic core and the upper magnetic core
   a front body of a magnetic pole, the front body having a front end for facing a magnetic recording medium, a rear end opposite to the front end, and a flat top surface, and
   a rear body of a magnetic pole, the rear body having a front end and a laminated portion having a flat under surface contacting the front body flat top surface, the laminated portion extending along the flat top surface from the front end of the rear body to the rear end of the front body, the laminated portion having a greater width in a direction of track width than a width of the front body; and
   a coil interposed between the lower magnetic core and the upper magnetic core, the coil being insulated from the lower magnetic core and the upper magnetic core,
   wherein the flat under surface of the rear body extends beyond the rear end of the front body.

2. The thin-film magnetic head according to claim 1, wherein the front body has a lateral surface defined at a cross-section in the direction of track width, a taper angle φ formed between the lateral surface and the flat top surface of the front body satisfying $0<\phi<45$ degrees.

3. The thin-film magnetic head according to claim 1, wherein the rear body further has a portion curved or bent in a direction facing away from another core, the curved or bent portion being disposed behind the rear end of the front body.

4. The thin-film magnetic head according to claim 1, wherein the front end of the rear body is positioned behind the front end of the front body.

5. The thin-film magnetic head according to claim 1, wherein the front body has a substantially rectangular parallelepiped shape.

6. The thin-film magnetic head according to claim 1, wherein the flat top surface of the front body contacts a flat surface of a nonmagnetic layer surrounding the front body.

7. The thin-film magnetic head according to claim 1, wherein the front body comprises a magnetic member embedded in a preformed trench of a nonmagnetic layer.

8. The thin-film magnetic head according to claim 7, wherein the magnetic member has at least one of a bottom wall with a chamfered outer edge and a lateral wall with a chamfered upper outer edge, the lateral wall of the magnetic member substantially having a taper converging in a direction of depth of the trench.

9. The thin-film magnetic head according to claim 1, wherein an anisotropic magnetic field of the front body is larger than that of the rear body.

10. The thin-film magnetic head according to claim 1, wherein the front body includes a laminate structure having a plurality of magnetic layers and nonmagnetic layers each interposed between the magnetic layers.

11. The thin-film magnetic head according to claim 1, wherein the front body of one of the lower magnetic core and the upper magnetic core and a rear auxiliary body of another magnetic core are disposed on the same plane.

12. A thin-film, magnetic head comprising:

a lower magnetic core;

an upper magnetic core formed above the lower magnetic core with a magnetic gap therebetween, at least one of the lower magnetic core and the upper magnetic core being formed over a substrate and comprising a front body of a magnetic pole, the front body having a front end for facing a magnetic recording medium and a rear end opposite to the front end, and a rear body of a magnetic pole, the rear body having a laminated portion connected at an angle of from 90 to 120 degrees to the front body to form a projection on the substrate having a substantially convex shape; and a coil interposed between the lower magnetic core and the upper magnetic core, the coil being insulated from the lower magnetic core and the upper magnetic core, wherein the laminated portion of the rear body has a flat under surface contacting a flat top surface of the front body, the flat under surface of the laminated portion extending from a front end of the rear body to beyond the rear end of the front body.

13. The thin-film magnetic head according to claim 12, wherein the laminated portion includes a lateral surface, a taper angle φ formed between the lateral surface and the flat surface of the laminated portion being no more than 45 degrees.

14. The thin-film magnetic head according to claim 12, wherein a width of the laminated portion in a direction of track width is greater than a width of the front body.

15. The thin-film magnetic head according to claim 12, wherein the rear body further includes a portion curved or bent in a direction facing away from another pole, the curved or bent portion being disposed behind the rear end of the front body.

16. The thin-film magnetic head according to claim 12, wherein the front end of the rear body is positioned behind the front end of the front body.

17. The thin-film magnetic head according to claim 12, wherein the front body has a substantially rectangular parallelepiped shape.

18. The thin-film magnetic head according to claim 12, wherein the front body has a flat top surface contacting a flat surface of a nonmagnetic layer surrounding the front body.

19. The thin-film magnetic head according to claim 12, wherein the front body comprises a magnetic member embedded in a preformed trench of a nonmagnetic layer.

20. The thin-film magnetic head according to claim 19, wherein the magnetic member has one of a bottom wall with a chamfered outer edge and a lateral wall with a chamfered upper outer edge.

21. The thin-film magnetic head according to claim 12, wherein an anisotropic magnetic field of the front body is larger than that of the rear body.

22. The thin-film magnetic head according to claim 12, wherein the front body includes a laminate structure having a nonmagnetic layer interposed between magnetic layers.

23. The thin-film magnetic head according to claim 12, wherein the front body and a rear auxiliary body are disposed on the same plane.

24. A thin-film magnetic head comprising:

a lower magnetic core;

an upper magnetic core formed above the lower magnetic core with a magnetic gap therebetween, at least one of the lower magnetic core and the upper magnetic core being formed over a substrate and comprising a front body of a magnetic pole, the front body having a front end for facing a magnetic recording medium and a rear end opposite to the front end, and a rear body of a magnetic pole, the rear body having a laminated portion connected at an angle of from 90 to 120 degrees to the front body to form a projection on the substrate having a substantially convex shape; and a coil interposed between the lower magnetic core and the upper magnetic core, the coil being insulated from the lower magnetic core and the upper magnetic core, wherein the upper magnetic core and the lower magnetic core each have front bodies, the front bodies each being embedded in a preformed trench of a nonmagnetic layer.

25. A thin-film magnetic head comprising:

a lower magnetic core comprising a first front body and a first rear body, the first rear body having an upper surface;

an upper magnetic core formed on the first front body with a magnetic gap therebetween, the upper magnetic core comprising a second front body of a magnetic pole for facing a magnetic recording medium, the second front body having an upper surface coplanar with the upper surface of the first rear body, and a second rear body of the magnetic pole having a portion partly connected to the second front body; and a coil interposed between the lower magnetic core and the upper magnetic core, the coil being insulated from the lower magnetic core and the upper magnetic core.

26. The thin-film magnetic head according to claim 25, wherein the second rear body includes a laminated portion on a flat surface of the second front body, the laminated portion having a flat surface extending from a front end of the second rear body to beyond a rear end of the second front body.

27. The thin-film magnetic head according to claim 26, wherein the laminated portion includes a lateral surface, a taper angle φ formed between the lateral surface and the first flat surface of the laminated portion being no more than 45 degrees.

28. The thin-film magnetic head according to claim 26, wherein a width of the laminated portion in a direction of track width is greater than a width of the second front body in the direction of the track width.

29. The thin-film magnetic head according to claim 25, wherein the second rear body further has a portion curved or bent in a direction facing away from the magnetic gap, the curved or bent portion being disposed behind a rear end of the second front body.

30. The thin-film magnetic head according to claim 25, wherein a front end of the second rear body is positioned behind a front end of the second front body.

31. The thin-film magnetic head according to claim 25, wherein the second front body has a substantially rectangular parallelepiped shape.

32. The thin-film magnetic head according to claim 25, wherein the upper surface of the second front body is coplanar with a flat surface of an insulating layer surrounding the second front body.

33. The thin-film magnetic head according to claim 25, wherein the second front body comprises a magnetic member embedded in a preformed trench of an insulating layer.

34. The thin-film magnetic head according to claim 33, wherein the magnetic member has one of a bottom wall with a chamfered outer edge and a lateral wall with a chamfered upper outer edge.

35. The thin-film magnetic head according to claim 33, wherein each of the upper magnetic core and the lower magnetic core has its respective front body embedded in the trench.

36. The thin-film magnetic head according to claim 25, wherein an anisotropic magnetic field of a magnetic member of the front body is greater than that of a magnetic member of the rear body.

37. The thin-film magnetic head according to claim 25, wherein the first and second front bodies include a laminate structure having a plurality of magnetic layers and nonmagnetic layers, each of the nonmagnetic layers being interposed between the magnetic layers.

38. The thin-film magnetic head according to claim 25, wherein the second front body and a rear auxiliary body of the first rear body are disposed on the same plane.

* * * * *

UNITED STATES PATENT AND TRADEMARK OFFICE
CERTIFICATE OF CORRECTION

PATENT NO.:     5,872,693

DATED:          February 16, 1999

INVENTOR(S):    Hiroaki Yoda et al.

It is certified that an error appears in the above-identified patent and that said Letters Patent is hereby corrected as shown below:

Claim 1, column 26, line 17, after "core" (second occurrence), insert --comprising--.

Signed and Sealed this

Thirty-first Day of August, 1999

*Attest:*

Q. TODD DICKINSON

*Attesting Officer*     Acting Commissioner of Patents and Trademarks